US008429140B1

(12) United States Patent  (10) Patent No.: US 8,429,140 B1
Lolayekar et al.  (45) Date of Patent: Apr. 23, 2013

(54) SYSTEM AND METHOD FOR REPRESENTING APPLICATION OBJECTS IN STANDARDIZED FORM FOR POLICY MANAGEMENT

(75) Inventors: Santosh C. Lolayekar, Cupertino, CA (US); Balamurali Palaiah, Sunnyvale, CA (US); Boris Teterin, Redwood City, CA (US)

(73) Assignee: NetApp. Inc., Sunnyvale, CA (US)

( * ) Notice: Subject to any disclaimer, the term of this patent is extended or adjusted under 35 U.S.C. 154(b) by 83 days.

(21) Appl. No.: 12/939,097

(22) Filed: Nov. 3, 2010

(51) Int. Cl.
*G06F 17/30* (2006.01)
(52) U.S. Cl.
USPC ............ 707/694; 707/763; 707/798; 707/812
(58) Field of Classification Search .................. 707/694, 707/736, 763, 798, 812, 821, 953, 954, 962, 707/999.1, 999.205
See application file for complete search history.

(56) References Cited

U.S. PATENT DOCUMENTS

| 2005/0044089 | A1* | 2/2005 | Wu et al. ....................... 707/100 |
| 2006/0095705 | A1 | 5/2006 | Wichelman |
| 2007/0150690 | A1* | 6/2007 | Chen et al. .................... 711/170 |
| 2007/0220061 | A1* | 9/2007 | Tirosh et al. .................. 707/200 |
| 2007/0244940 | A1 | 10/2007 | Devarakonda |
| 2008/0208917 | A1 | 8/2008 | Smoot |
| 2008/0320219 | A1 | 12/2008 | Okada |
| 2009/0112921 | A1 | 4/2009 | Oliveira |
| 2010/0145917 | A1* | 6/2010 | Bone et al. .................... 707/694 |
| 2011/0181595 | A1 | 7/2011 | Nachmanson |

OTHER PUBLICATIONS

International Search Report and Written Opinion of the International Searching Authority dated May 23, 2012 issued for Application No. PCT/US2011/058464.
Office Action dated Jul. 24, 2012 issued by the USPTO for U.S. Appl. No. 12/939,098.
Office Action issued by the USPTO on Sep. 26, 2012 for U.S. Appl. No. 12/939,098.
Office Action issued by the USPTO on Feb. 4, 2013 for U.S. Appl. No. 12/939,098.

* cited by examiner

*Primary Examiner* — Greta Robinson
(74) *Attorney, Agent, or Firm* — Stattler-Suh PC

(57) ABSTRACT

Described herein are systems and methods for providing data policy management over application objects in a storage system environment. An application object may comprise non-virtual or virtual objects (e.g., non-virtual-based applications, virtual-based applications, or virtual storage components). An application object manager may represent application objects by producing mapping graphs and/or application object data that represent application objects in a standardized manner. A mapping graph for an application object may describe a mapping between the application object and its underlying storage objects on a storage system. Application object data may describe a mapping graph in a standardized format. Application object data representing application objects may be received by an application policy manager that manages data policies on the application objects (including virtual applications and virtual storage components) based on the received application object data. Data policies may include policies for backup, service level objectives, recovery, monitoring and/or reporting.

14 Claims, 19 Drawing Sheets

| App Object ID (905) | Mapping Graph (910) | Graph Metadata (915) | Graph Data (920) |
|---|---|---|---|
| AO1 | MG1 | 1) Hyper-V VM, VHD, local drive<br>2) VM – backup, SLO VHD – backup, RBAC local drive – SLO<br>3) VM – features VHD – features local drive – features | For each node in mapping graph:<br>1) node type<br>2) node identifier<br>3) node name<br><br>Plurality of node pairs in parent/child relationships showing hierarchical relationships between the nodes |
| AO2 | MG2 | 1) VMWare VM, datastore, VMDK<br>2) VM – backup, RBAC datastore – RBAC VMDK – backup<br>3) VM – features datastore – features VMDK – features | For each node in mapping graph:<br>1) node type<br>2) node identifier<br>3) node name<br><br>Plurality of node pairs in parent/child relationships showing hierarchical relationships between the nodes |
| ... | | | |

FIG. 9

SYSTEM AND METHOD FOR REPRESENTING APPLICATION OBJECTS IN STANDARDIZED FORM FOR POLICY MANAGEMENT

FIELD OF THE INVENTION

The present invention relates to storage systems and, more specifically, to a system and method for representing application objects in standardized form for policy management.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units (LUs). A known type of file system is a write-anywhere file system that does not overwrite data on disks. An example of a write-anywhere file system that is configured to operate on a storage system is the Write Anywhere File Layout (WAFL®) file system available from NetApp, Inc. Sunnyvale, Calif.

The storage system may be further configured to allow many servers to access data containers stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a storage system architecture configured to service many server. In some embodiments, the storage system architecture provides one or more aggregates, each aggregate comprising a set of one or more storage devices (e.g., disks). Each aggregate may store one or more storage objects, such as and one or more volumes. The aggregates may be distributed across a plurality of storage systems interconnected as a cluster. The storage objects (e.g., volumes) may be configured to store content of data containers, such as files and logical units, served by the cluster in response to multi-protocol data access requests issued by servers.

Each storage system (node) of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each storage system is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system. Each server typically executes numerous applications requiring the data services of the cluster.

A current trend in storage system environments is to virtualize application and storage resources in the cluster. A virtual server environment may typically include multiple physical servers accessing the storage system having multiple storage devices for storing client data. Each server may include multiple virtual machines (VMs) that reside and execute on the server. Each VM (sometimes referred to as a virtual application or virtual server) may comprise a separate encapsulation or instance of a separate operating system and one or more applications that execute on the server. As such, each VM on a server may have its own operating system and set of applications and function as a self-contained package on the server and multiple operating systems may execute simultaneously on the server.

Each VM on a server may be configured to share the hardware resources of the server. Each server may include a VM manager module/engine (e.g., VMware™ ESX, Microsoft™ Hyper-V, Citrix XenServer™, etc. that executes on the server to produce and manage the VMs. The VM manager module/engine may also virtualize the hardware and/or software resources of the servers for use by the VMs. The operating system of each VM may utilize and communicate with the resources of the server via the VM manager engine. The virtual server environment may also include a plurality of clients connected with each server for accessing client data stored on the storage system. Each client may connect and interface/interact with a particular VM of a server to access client data of the storage system. From the viewpoint of a client, the VM may comprise a virtual server that appears and behaves as an actual physical server or behaves as an actual desktop machine. For example, a single server may by "virtualized" into 1, 2, 4, 8, or more virtual servers or virtual desktops, each running their own operating systems, and each able to support one or more applications.

A storage system may be configured to allow servers to access its data, for example, to read or write data to the storage system. A server may execute an application that "connects" to the storage system over a computer network such as a shared local area network (LAN), a wide area network (WAN), or a virtual private network (VPN) implemented over a public network such as the Internet. The application may send an access request (read or write request) to the storage system for accessing particular data stored on the storage system. Each server may also include multiple VMs, each VM being used by and connected with a client through a computer network. Each VM may also execute an application for sending read/write requests (received from the connected client) for accessing data on the storage system. The VM applications executing on the server may service the connected clients by receiving the client access requests and submitting the access requests to the storage system for execution.

There are several advantages in implementing VMs on a server. Having multiple VMs on a single server enables multiple clients to use multiple different operating systems executing simultaneously on the single server. Also, multiple VMs executing their own applications may be logically separated and isolated within a server to avoid conflicts or interference between the applications of the different VMs. As each VM is separated and isolated from other VMs, a security issue or application crash in one VM does not affect the other VMs on the same server. Also, VMs can rapidly and seamlessly be shifted from one physical server to any other server, and optimally utilize the resources without affecting the applications. Such a virtualization of the servers, and/or virtualization of the storage network environment, allows for efficiency and performance gains to be realized.

As discussed above, the VM manager module/engine of a physical server may virtualize the hardware and/or software resources for use by the VMs. For each physical server these resources may include storage resources/objects (e.g., volumes, logical units, etc.) distributed on one or more storage systems. Each storage system may allocate its storage objects to one or more physical servers, each allocated storage object being "mounted" (i.e., made available) to a particular physical server. For example, a storage system may allocate one or more logical units (LUs) to a physical server, each LU being mounted and made available to the physical server. Each physical server may have one or more LUs available for use from one or more storage systems. A mounted storage object may appear to the server as a direct-attached physical storage device, such as a direct-attached Small Computer System Interface (SCSI) or Serial ATA (SATA) disk device.

Some or all storage resources/objects (e.g., LUs) that are made available to a physical server may be virtualized by the VM manager module for use by the VMs. The VM manager module may virtualize the storage objects by producing virtual storage components for use by the VMs and virtual storage information that describes these virtual storage components. For example, a virtual storage component may comprise a virtual hard disk (VHD) or virtual machine disk (VMDK) allocated to a VM. For each VM, the VM manager module may allocate one or more virtual storage components for use by the VM for accessing and storing data. The virtual storage information may be used by a VM to locate and access its virtual storage component(s).

To a VM, each virtual storage component may appear as a directly attached physical storage device (e.g., a drive or disk) that is directly accessed by the VM. But in fact, each virtual storage component is supported by an underlying corresponding storage resource/object residing somewhere on one of the storage systems. As used herein, an "underlying" storage object corresponding to a virtual storage component comprises the storage object on the storage system that stores the actual data for the virtual storage component. As such, data accesses (e.g., read/write accesses) to and from the virtual storage component by the VM ultimately comprises data accesses to and from the underlying storage object corresponding to the virtual storage component.

Another current trend in storage system environments is to provide policy management over storage objects stored on the storage systems. Policy management may provide services such as maintenance, monitoring, backup, etc. of the storage objects. Current policy management programs, however, do not provide policy management at a higher level than the storage objects on the storage systems and do not provide policy management for any virtual entities (such as virtual applications and virtual storage components). As such, there is a need for a system and method for providing a more flexible and efficient higher level policy management for non-virtual as well as virtual applications and storage resources.

SUMMARY OF THE INVENTION

Described herein are systems and methods for representing application objects in a standardized manner. In some embodiments, an application object comprises a non-virtual application, a virtual application, or a virtual storage component used by a virtual application hosted on a server coupled to a storage system. Each application object may use a storage object contained on the storage system for storing data. In some embodiments, a mapping graph is produced for each application object showing mappings between the application object hosted on the server and its storage objects stored on a storage system. Application object data may be produced to represent the mapping graph of each application object in a standardized format. The application object data may be used to perform data policy management on application objects based on the application object data.

In some embodiments, an application object manager engine is configured for determining the application objects hosted on a server. For each application object, the application object manager engine determines a mapping between the application object and its storage object on the storage system by determining, for each storage object, high-level and low-level storage object information for the storage object. The high-level storage object information may comprise information used by the application object to access a virtual storage component corresponding to the storage object, the high-level storage object information mapping the application object to the virtual storage component. The low-level storage object information may comprise information used by a storage system to access the storage object which corresponds to the virtual storage component, the low-level storage object information mapping the virtual storage component to the storage object. For each storage object, the application object manager engine may combine the high-level and low-level storage object information to determine a mapping relationship between the application object hosted on the server and the storage object on the storage system.

For each application object, the application object manager engine may then produce a mapping graph representing mappings between the application object and each of its storage objects. A mapping graph for an application object may comprise a plurality of nodes interconnected by a plurality of connectors, the plurality of nodes arranged in a plurality of hierarchical levels and parent/child relationships. A mapping graph for an application object may comprise a top hierarchical level comprising a top server node representing a server hosting the application object, a first set of hierarchical levels comprising one or more levels of application object nodes representing application objects, a second set of hierarchical levels comprising one or more levels of storage object nodes representing storage objects that the application objects represented in the first set of hierarchical levels map to, and a bottom hierarchical level comprising storage system nodes representing storage systems storing storage objects represented in the second set of hierarchical levels. For example, the first set of hierarchical levels may comprise a parent node representing a virtual machine and a child node representing a virtual storage component used by the virtual machine. The second set of hierarchical levels may comprise a storage object node representing a storage object that the virtual storage component maps to, the storage object node comprising a child node of the node representing the virtual storage component.

For each application object, the application object manager engine may then produce application object data describing the mapping graph for the application object. The application object data may comprise graph data describing the mapping graph and graph metadata describing the graph data. The graph metadata may specify one or more types of application objects included in the mapping graph and data policies permitted for each type of application object. The types of permitted data policies may be different for different types of application objects. For example, a first set of one or more data policies is permitted for a first type of application object and a second set of one or more data policies is permitted for a second type of application object, the first and second sets comprising different sets of data policies.

The graph data may specify hierarchical relationships between the nodes in the mapping graph. Also, for each node, the graph data may specify the type of node and a unique node identifier. The type of node may specify a server node representing a server, an application object node representing an application object, a storage object node representing a storage object, or a storage system node representing a storage system. For each application object node, the graph data may further specify the type of application object represented by the application object node, the types of application objects comprising a non-virtual application, a virtual application, or a virtual storage component.

For each application object, the application object manager engine may then send the application object data representing the application object to an application policy manager engine for performing data policy management on the application object based on the application object data. For example, the data policies may include policies for backup, service level objectives, recovery, monitoring and/or reporting. For each application object, the application policy manager engine may apply one or more policies to the application object by applying the one or more policies to the underlying storage objects of the application object by using the application object data that specifies mappings to the underlying storage objects.

BRIEF DESCRIPTION OF THE DRAWINGS

The novel features are set forth in the appended claims. However, for purpose of explanation, several embodiments of the invention are set forth in the following figures.

FIG. 9 shows an exemplary application object data structure used in some embodiments;

DETAILED DESCRIPTION

Figure 1A:
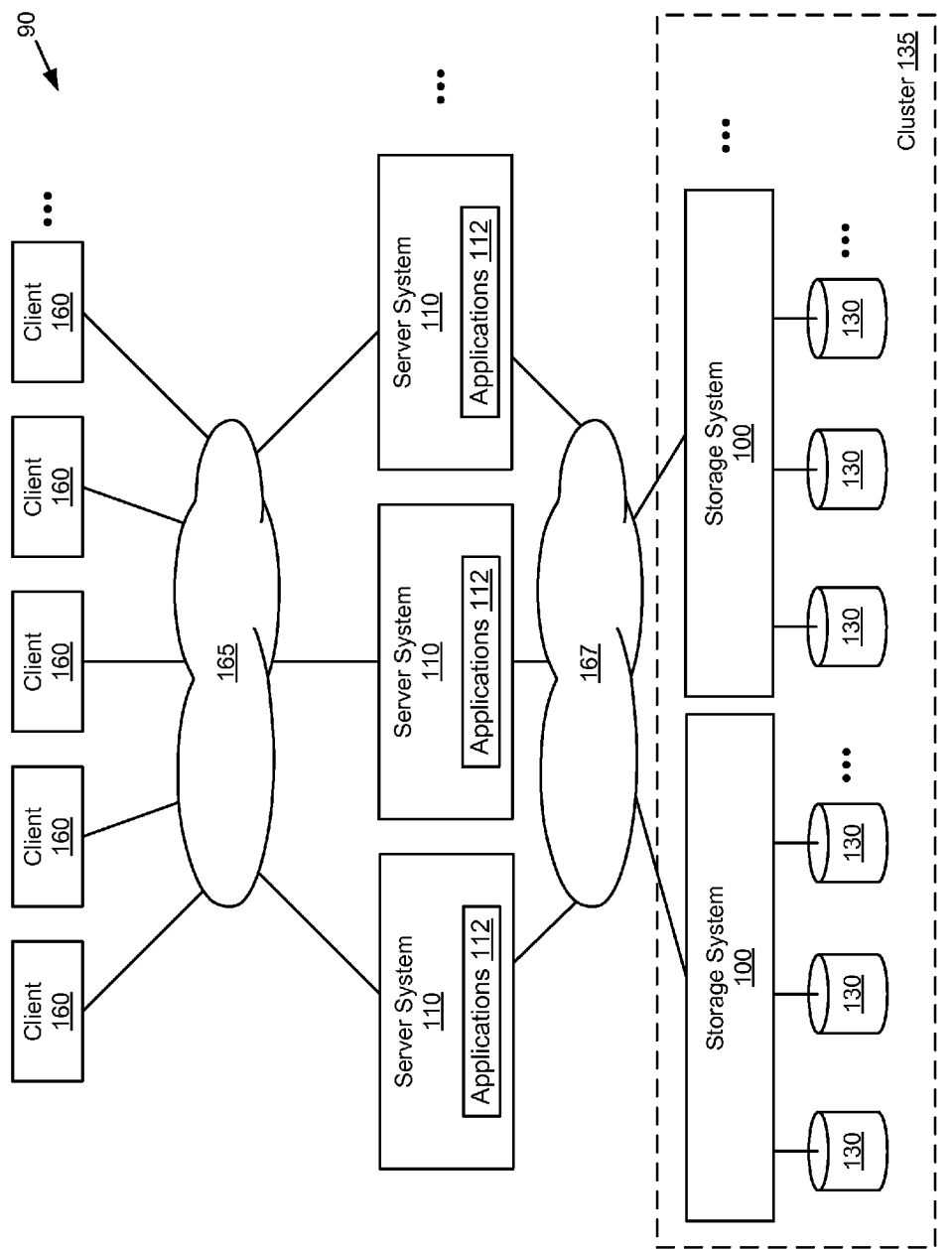
FIG. 1A is a block diagram of an exemplary virtual server environment in which some embodiments operate.

In the following description, numerous details are set forth for purpose of explanation. However, one of ordinary skill in the art will realize that the embodiments described herein may be practiced without the use of these specific details. In other instances, well-known structures and devices are shown in block diagram form in order to not obscure the description with unnecessary detail.

The description that follows is divided into four sections. Section I contains terms used herein. Section II describes a virtual server environment in which some embodiments operate. Section III describes an application object manager for representing application objects in a standardized manner. Section IV describes an application policy manager for managing data policies for application objects.

I. Terms

Application object: As used herein, an application object may comprise an application or a virtual storage component used by a virtual-based application. An application may comprise a non-virtual based application (e.g., email or database application) or a virtual application (e.g., VM). An application object may comprise a non-virtual object or virtual object. A non-virtual object may comprise a non-virtual based application. A virtual object may comprise a virtual based application or a virtual storage component used by a virtual based application. As such, an application object may comprise a non-virtual application, a virtual application, or a virtual storage component used by a virtual application. An application object may be represented/described by a mapping graph and/or application object data (comprising graph metadata and graph data).

Application object manager engine: As used herein, an application object manager engine may reside on a host server and be used for representing/describing application objects in a standardized manner. In some embodiments, the application object manager engine may do so by producing mapping graphs and/or application object data that represents/describes application objects in a standardized manner. The application object manager engine may sometimes be referred to as a host service engine.

Application policy manager engine: As used herein, an application policy manager engine may reside on a management server and be used for managing data policies on application objects. In some embodiments, the application object data representing application objects are received from the application object manager engine and the application policy manager engine manages data policies on the application objects based on the received application object data. The application policy manager engine may sometimes be referred to as a central service engine.

Cluster storage system: As used herein, a cluster storage system may comprise a set of one or more storage systems. In some embodiments, the cluster may comprise one storage system. As such, the terms "cluster" and "storage system" may sometimes be used interchangeably. In other embodiments, a cluster comprises a plurality of storage systems.

Storage object: As used herein, a storage object comprises any logically definable storage element hosted, stored, or contained within a cluster storage system. Each storage object may be stored in one or more storage systems on one or more storage devices of the cluster storage system. A non-exhaustive list of storage object examples include aggregates, volumes or virtual volumes (e.g., flexible volumes), logical units (LUs) in a q tree, q trees in a volume, etc. In other embodiments, storage objects comprise any other logically definable storage element stored or contained within the cluster storage system.

Virtual object: As used herein, a virtual object may comprise a virtual based application or a virtual storage component used by a virtual based application. For example, in a VMware™ environment, a virtual object may comprise a virtual application, such as a VM, or a virtual storage component, such as a datastore or virtual machine disk (VMDK). For example, in a Hyper-V environment, a virtual object may comprise a virtual application, such as a VM, or a virtual storage component, such as a virtual hard drive (VHD) or local drive. In some embodiments, a virtual storage component may reside and be hosted on a server and does not reside on a storage system. A virtual storage component may have an underlying storage object stored on a storage system.

II. Virtual Server Environment

FIG. 1A is a block diagram of an exemplary virtual server environment 90 in which some embodiments operate. The environment 90 comprises a set of two or more server systems 110 connected to one or more client systems 160 via a network 165. The server systems 110 may each access one or more storage systems 100 that are connected to the server systems 110 via a network 167. The one or more storage systems 100 comprises a cluster storage system 135. Each storage system 100 in the cluster 135 may comprise a set of storage devices 130 for storing client data, the storage devices 130 of the cluster 135 comprising a shared storage of the storage system 100. Note that the server systems 110 are also connected to each other (e.g., via network 165 or network 167) for communicating with each other (e.g., for working collectively to provide data-access service to the client systems 160 and for collectively hosting a plurality of virtual machines as described herein).

A client system 160 may comprise a computer system that may interact with a server system 110 for submitting read/write access requests and for receiving or transmitting data from or to the server systems 110 over the network 165. In a virtual server environment, a client system 160 may interact over the network 165 with one or more virtual machines (VMs) executing on a server system 110 for submitting read/write access requests and for receiving or transmitting data from or to the storage system 100 over the network 167.

A server system 110 may comprise a computer system that may execute one or more applications 112 that interacts with the client systems 160 for receiving read/write access requests and receiving or transmitting data from or to the client systems 160 over the network 165. A server system 110 may be connected to the client systems 160 over a network 165 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110, each server system 110 hosting multiple client systems embodied as virtual machines, one virtual machine per each client system 160. The network 165 and/or subnets of networks 165 may be physically embodied within such a chassis.

An application 112 executing on a server system 110 may provide data-access services to client systems 160 by receiving and processing access requests from the client systems 160 for data from the storage system(s) 100. In turn, an application 112 utilizes the services of the storage system 100 to access, store, and manage data in a set of storage devices 130. As such, a server system 110 may execute one or more applications 112 that submit access requests for accessing particular storage objects on the storage devices. Each application 112 may submit access requests for accessing particular storage objects on the storage systems of the cluster 135 and the cluster 135 may perform the received requests on the storage objects. An application 112 may comprises a non-virtual based application, such as a typical email exchange application or database application. In other embodiments, an application 112 may comprise a virtual-based application, such as a virtual machine (discussed below).

A storage system 100 may be coupled locally to a server system 110 over a network 167 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110 within a single chassis (e.g., a blade server chassis), with each instance of a server system 110 in communication with each other instance of a server system 110 in the chassis via network 167.

Interaction between the server systems 110 and the storage system(s) 100 can enable the provision of storage services. That is, the server systems 110 may request the services of the storage system(s) 100 (by submitting read/write access requests), and the storage system(s) 100 may respond to read/write access requests of the server systems 110 by receiving or transmitting data to the server systems 110 over the network 167 (e.g., by exchanging data packets through a connection over the network 167).

Communications between a storage system 100 and any of server systems 110 are typically embodied as packets sent over the computer network 167. A server system 110 may send an access request (a read/write access request) to the storage system 100 for accessing particular data stored on the storage system. The server system 110 may request the services of the storage system 100 by issuing storage-access protocol messages formatted in accordance with a conventional storage-access protocol for accessing storage devices (such as CIFS, NFS, etc.). Access requests (e.g., read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), or Internet Small Computer System Interface (iSCSI) Storage Area Network (SAN) access—when accessing data in the form of blocks.

Each application 112 executing on a server system 110 may utilize services of the cluster 135 to store and access its data. The storage system 100 may comprise a computer system that stores data in a set of one or more storage devices 130 as storage objects. A storage device 130 may comprise writable storage device media such as disk devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 130 may comprise storage objects comprising one or more storage volumes, where each volume has a file system implemented on the volume. A file system implemented on the storage devices 130 may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical units (LUs).

A. Multi-Protocol Storage System

Figure 1B:
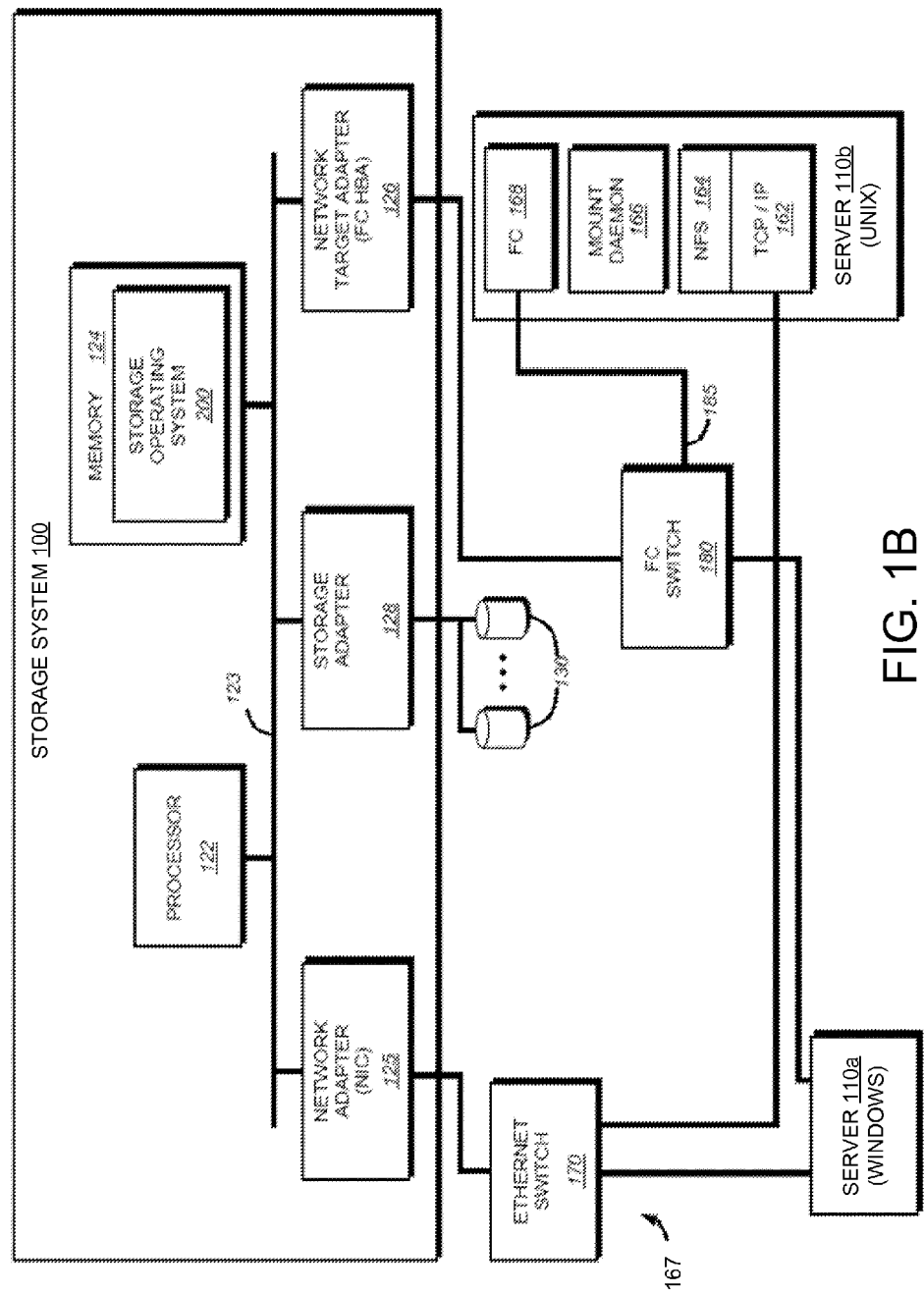
FIG. 1B is a schematic block diagram of a multi-protocol storage system used in some embodiments.

FIG. 1B is a schematic block diagram of a multi-protocol storage system 100 configured to provide storage service relating to the organization of information on storage devices, such as disks 130. The storage system 100 is illustratively embodied as a storage system comprising a processor 122, a memory 124, a plurality of network adapters 125, 126 and a storage adapter 128 interconnected by a system bus 123. The multi-protocol storage system 100 also includes a storage operating system 200 that provides a virtualization system (and, in particular, a file system) to logically organize the information as a hierarchical structure of named directory, file and virtual disk (vdisk) storage objects on the disks 130.

Whereas servers of a NAS-based network environment have a storage viewpoint of files, the servers of a SAN-based network environment have a storage viewpoint of blocks or disks. To that end, the multi-protocol storage system 100 presents (exports) disks to storage area network (SAN) servers through the creation of vdisk objects. A vdisk object (hereinafter "vdisk") is a special file type that is implemented by the virtualization system and translated into an emulated disk as viewed by the SAN servers. The multi-protocol storage system thereafter makes these emulated disks accessible to the SAN servers through controlled exports, as described further herein. A vdisk may also be referred to as a logical unit (LU) having an associated logical unit number (LUN) that uniquely identifies the vdisk/LU within a volume of the storage system. In some embodiments, a volume may only contain a limited number of vdisks/LUs up to a maximum number of allowed vdisks/LUs.

In the illustrative embodiment, the memory 124 comprises storage locations that are addressable by the processor and adapters for storing software program code and data structures. The processor and adapters may, in turn, comprise processing elements and/or logic circuitry configured to execute the software code and manipulate the various data structures. The storage operating system 200, portions of which are typically resident in memory 124 and executed by the processing elements, functionally organizes the storage system by, inter alia, invoking storage operations in support of the storage service implemented by the storage system. It will be apparent to those skilled in the art that other processing and memory implementations, including various computer readable media, may be used for storing and executing program instructions pertaining to the inventive system and method described herein.

The network adapter 125 couples the storage system to a plurality of servers 110a,b over point-to-point links, wide area networks, virtual private networks implemented over a public network (Internet) or a shared local area network, hereinafter referred to as an illustrative Ethernet network 167. Therefore, the network adapter 125 may comprise a network interface card (NIC) having the mechanical, electrical and signaling circuitry needed to connect the storage system to a network switch, such as a conventional Ethernet switch 170. For this NAS-based network environment, the servers are configured to access information stored on the multi-protocol storage system as files. The servers 110 communicate with the storage system over network 167 by exchanging discrete frames or packets of data according to pre-defined protocols, such as the Transmission Control Protocol/Internet Protocol (TCP/IP).

The servers 110 may be general-purpose computers configured to execute applications over a variety of operating systems, including the UNIX® and Microsoft Windows® operating systems. Server systems generally utilize file-based access protocols when accessing information (in the form of files and directories) over a NAS-based network. Therefore, each server 110 may request the services of the storage system 100 by issuing file access protocol messages (in the form of packets) to the storage system over the network 167. For example, a server 110a running the Windows operating system may communicate with the storage system 100 using the Common Internet File System (CIFS) protocol. On the other hand, a server 110b running the UNIX operating system may communicate with the multi-protocol storage system using the Network File System (NFS) protocol 164 over TCP/IP 162. It will be apparent to those skilled in the art that other servers running other types of operating systems may also communicate with the integrated multi-protocol storage system using other file access protocols.

The storage network "target" adapter 126 also couples the multi-protocol storage system 100 to servers 110 that may be further configured to access the stored information as blocks or disks. For this SAN-based network environment, the storage system is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the storage system 100 to a SAN network switch, such as a conventional FC switch 180. In addition to providing FC access, the FC HBA may offload fibre channel network processing operations for the storage system.

The servers 110 generally utilize block-based access protocols, such as the Small Computer Systems Interface (SCSI) protocol, when accessing information (in the form of blocks, disks or vdisks) over a SAN-based network. SCSI is an input/output (I/O) interface with a standard, device independent protocol that allows different peripheral devices, such as disks 130, to attach to the storage system 100. In SCSI terminology, servers 110 operating in a SAN environment are initiators that initiate requests and commands for data. The multi-protocol storage system is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage system 100 supports various SCSI-based protocols used in SAN deployments, including SCSI encapsulated over TCP (iSCSI), SCSI encapsulated over FC (FCP), and Fibre Channel Over Ethernet (FCoE). The initiators (hereinafter servers 110) may thus request the services of the target (hereinafter storage system 100) by issuing iSCSI and FCP messages over the network 167, 185 to access information stored on the disks. It will be apparent to those skilled in the art that the servers may also request the services of the integrated multi-protocol storage system using other block access protocols. By supporting a plurality of block access protocols, the multi-protocol storage system provides a unified and coherent access solution to vdisks/LUs in a heterogeneous SAN environment.

The storage adapter 128 cooperates with the storage operating system 200 executing on the storage system to access information requested by the servers. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the servers.

Storage of information on the storage system 100 is preferably implemented as one or more storage volumes that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

In accordance with an illustrative embodiment of the present invention, a server 110*b* includes various software layers or modules executing thereon. For example, the server 110*b* may be executing a Network File System (NFS) layer 164 that implements the NFS protocol and cooperates with a TCP/IP layer 162 to enable the server to access files stored on the storage system using the NFS protocol. The server 110*b* may also include a Fibre Channel (FC) driver 168 for communicating with the storage system utilizing the Fibre Channel protocol.

A server 110*b* may also execute, in an illustrative embodiment, a mount daemon 166 which interacts with the storage operating system 200 of the storage system 100 to enable transparent access to blocks, such as vdisks, stored on a storage system using a file-based protocol such as NFS. The mount daemon 166 operates in conjunction with the NFS Proxy layer, described further below, to provide appropriate device addresses to the storage system 100. The mount daemon 166 may be implemented as a background process, thread or may be a remotely callable library of procedures that performs the various functionality described below. A method and apparatus for allowing a server transparent access to blocks, such as vdisks, stored on a storage system using a file-based protocol. The process of allowing a server transparent access to a vdisk using a file-based protocol may sometimes be referred to herein as "transparent access process/technique."

It should be noted that the software layers that are shown for server 110*b* are exemplary only and that they may be varied without departing from the spirit and scope of the invention. Additionally, it should be noted that the NFS layer 164 is shown for exemplary purposes only. Any file-based protocol may be utilized in accordance with the teachings of the present invention, including, for example CIFS.

B. Storage System Operating System

To facilitate access to the disks 130, the storage operating system 200 implements a write-anywhere file system of a virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN storage system approach to storage by enabling file-based (NAS) access to the named files and directories, while further enabling block-based (SAN) access to the named vdisks on a file system based storage platform. The file system simplifies the complexity of management of the underlying physical storage in SAN deployments.

As noted, a vdisk is a special file type in a volume that derives from a normal (regular) file, but that has associated export controls and operation restrictions that support emulation of a disk. Unlike a file that can be created by a server using, e.g., the NFS or CIFS protocol, a vdisk is created on the multi-protocol storage system via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow LUs and exports to persist over, e.g., reboot operations, while also enabling management of the vdisk as a single disk object in relation to NAS servers.

In the illustrative embodiment, the storage operating system 200 may comprise Data ONTAP® storage operating system, available from NetApp, Inc. of Sunnyvale, Calif., which implements a Write Anywhere File Layout (WAFL®) file system. However, it is expressly contemplated that any appropriate storage operating system, including a write in-place file system, may be enhanced for use in accordance with embodiments described herein. As such, where the term "WAFL" is employed, it should be taken broadly to refer to any storage operating system that is otherwise adaptable to the teachings of this embodiment.

As used herein, the term "storage operating system" generally refers to the computer-executable code operable on a computer that manages data access and may, in the case of a multi-protocol storage system, implement data access semantics, such as the Data ONTAP® storage operating system, which is implemented as a microkernel. The storage operating system can also be implemented as an application program operating over a general-purpose operating system, such as UNIX® or Windows®, or as a general-purpose operating system with configurable functionality, which is configured for storage applications as described herein.

In addition, it will be understood to those skilled in the art that the inventive system and method described herein may apply to any type of special-purpose (e.g., storage serving storage system) or general-purpose computer, including a standalone computer or portion thereof, embodied as or including a storage system. Moreover, the teachings of this embodiment can be adapted to a variety of storage system architectures including, but not limited to, a network-attached storage environment, a storage area network and disk assembly directly-attached to a server or host computer. The term "storage system" should therefore be taken broadly to include such arrangements in addition to any subsystems configured to perform a storage function and associated with other equipment or systems.

Figure 2:
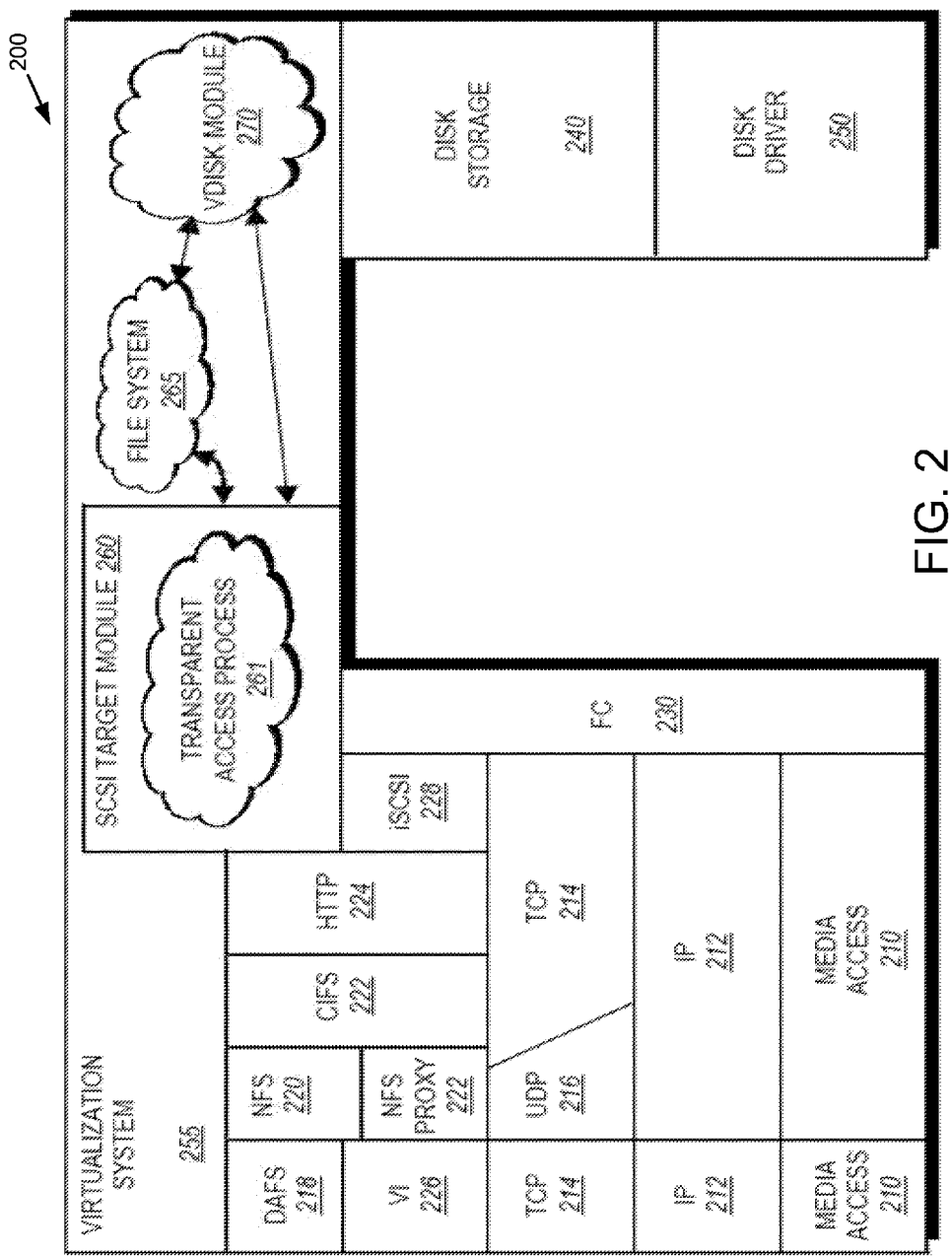
FIG. 2 is a schematic block diagram of an exemplary storage operating system used in some embodiments.

FIG. 2 is a schematic block diagram of an exemplary storage operating system 200 used in some embodiments. The storage operating system comprises a series of software layers organized to form an integrated network protocol stack or, more generally, a multi-protocol engine that provides data paths for servers to access information stored on the multi-protocol storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as remote direct memory access (RDMA), as required by the DAFS protocol 218.

The file system protocol layer also includes, in the illustrative embodiment a NFS proxy layer 222. In some embodiments, the NFS proxy layer 222 examines each NFS Open or look up commands received from a server to determine if the command is to utilize the transparent access technique. The NFS proxy layer 222 performs this function by examining the filename field of the received Open command, described further below. It should be noted that an NFS proxy layer is shown for exemplary purposes only. The teachings of the present embodiment may be utilized with any file-based protocol including, for example CIFS or HTTP. In such alternate embodiments, an appropriate proxy layer would be implemented within the storage operating system.

An iSCSI driver layer 228 provides block protocol access over the TCP/IP network protocol layers, while a FC driver layer 230 operates with the FC HBA 126 to receive and transmit block access requests and responses to and from the integrated storage system. The FC and iSCSI drivers provide FC-specific and iSCSI-specific access control to the LUs (vdisks) and, thus, manage exports of vdisks to either iSCSI or FCP or, alternatively, to both iSCSI and FCP when accessing a vdisk on the multi-protocol storage system. In addition, the storage operating system includes a disk storage layer 240 that implements a disk storage protocol, such as a RAID protocol, and a device driver layer 250 (e.g., disk driver layer) that implements a device control protocol (such as small computer system interface (SCSI), integrated drive electronics (IDE), etc.).

C. Transparent Access Process Components of Storage Operating System

Bridging the disk software layers with the integrated network protocol stack layers is a virtualization system 255. The virtualization system 255 is implemented, in the illustrative embodiment, by a file system 265 cooperating with virtualization modules illustratively embodied as, e.g., vdisk module 270 and SCSI target module 260. It should be noted that the vdisk module 270, file system 265 and SCSI target module 260 can be implemented in software, hardware, firmware, or a combination thereof.

The vdisk module 270 interacts with the file system 265 to provide a data path from the block-based SCSI target module to blocks managed by the file system. In essence, the vdisk module 270 manages SAN deployments by, among other things, implementing a comprehensive set of vdisk (LU) commands that are converted to primitive file system operations ("primitives") and that interact with the file system 265 and the SCSI target module 260 to implement the vdisks.

The SCSI target module 260, in turn, initiates emulation of a disk or LU by providing a mapping procedure that translates logical block access to LUs specified in access requests into virtual block access to the special vdisk file types and, for responses to the requests, vdisks into LUs. The SCSI target module is illustratively disposed between the iSCSI and FC drivers 228, 230 and the file system 265 to thereby provide a translation layer of the virtualization system 255 between the SAN block (LU) space and the file system space, where LUs are represented as vdisks.

In addition, the SCSI target module 260 includes one or more transparent access processes 261. The transparent access processes 261, described further below, enable servers to transparently access a vdisk by utilizing a file-based protocol. These transparent processes 261 cooperate with the mount daemon 166 executing on the server to implement the novel system and method for transparently accessing vdisks using a file-based protocol.

The file system 265 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

D. Transparent Access Process

As described above, the transparent access process/technique may enable an application 112 to issue a file-based protocol Open command and transparently access a virtual disk stored on a storage system using a block-based protocol. The server may utilize the convenient namespace of the file-based protocol, while obtaining the performance benefits of the high-speed data access path associated with the vdisk. The server may execute a mount daemon 166 that interacts with a NFS proxy layer 222 (or other file-based protocol proxy layer) executing on the storage system 100.

The transparent access is initiated by prepending a predetermined and special prefix to a filename contained in an Open command sent through the file-based protocol. The NFS proxy layer 222, executing within the storage operating system 200 of the storage system, identifies that the Open command is directed to a filename that contains the predetermined prefix and initiates the transparent access process (file to vdisk conversion). The NFS proxy layer 222, in conjunction with the SCSI target module 260 of the storage operating system, ensures that the file requested to be opened is represented as a vdisk which is exported to the requesting server. If the file to be opened is not already a vdisk, the procedure also converts it to one using conventional file to vdisk conversion routines. The storage system 100 then communicates with the mount daemon 166 executing on the server 110. The mount daemon ensures that the exported vdisk is mapped to the server and, if it is not already, causes the server 110 to rescan the SCSI devices connected thereto to identify the newly mounted vdisk. Thus, a server may open a vdisk utilizing a file-based protocol and its associated namespace but perform later data access operations using a block-based protocol data path.

Thus, applications and clients 160/users of servers 110 served by the storage system 100 may utilize the namespace available from the file-based protocol, while benefiting from the high-speed data connection provided by an underlying transport media, such as Fibre Channel, connected to the vdisk. This enables an application executing on a server of the storage system to issue an Open command to access the vdisk using a conventional file-based protocol, such as the NFS protocol. The application may invoke the use of a transparent access process executing on the storage system by prepending a predetermined and special prefix to the filename in the Open command.

A NFS proxy layer 222 of a storage operating system 200 checks the filename sent in the filename field of the Open command. If the filename does not include the special prefix, then the storage operating system processes the request using the conventional file-based protocol. However, if the file name includes the predetermined and special prefix, then the NFS proxy layer 222 maps the vdisk associated with the file to be opened to the server that issued the Open command. A logical unit number (LUN) associated with this vdisk (LU) is also mapped to the server by the NFS proxy layer. The NFS proxy layer also, via a remote procedure call (RPC) or similar application-to-application communication method, communicates with a mount daemon 166 executing on the server.

The mount daemon 166 communicates to the storage system a set of major and minor device numbers to be associated with a newly created character device instance. A character device is a block-level interface that permits an arbitrary number of bytes to be written to a device. Typically, the number of bytes written is a multiple of the size of the data blocks on the storage device. Using the returned major/minor numbers, the NFS proxy layer generates a response to the Open command and returns that response to the server. The server, upon receiving the response, generates a new instance of a character device using the major/minor device numbers. The server then returns a file descriptor to the issuing application.

Thus, to the issuing application, and users thereof, the file has been opened using conventional NFS or other file-based protocol commands and its associated namespace. However, the NFS proxy layer, in conjunction with the mount daemon has generated a new character device on the server that enables the server to read and write raw data over the Fibre Channel or other block-based network infrastructure. Thus, a server experiences the ease of use of the file-based namespace, while benefiting from the performance of the block-based network infrastructure.

III. Application Object Manager

A. Virtual Server Environment

Figure 3:
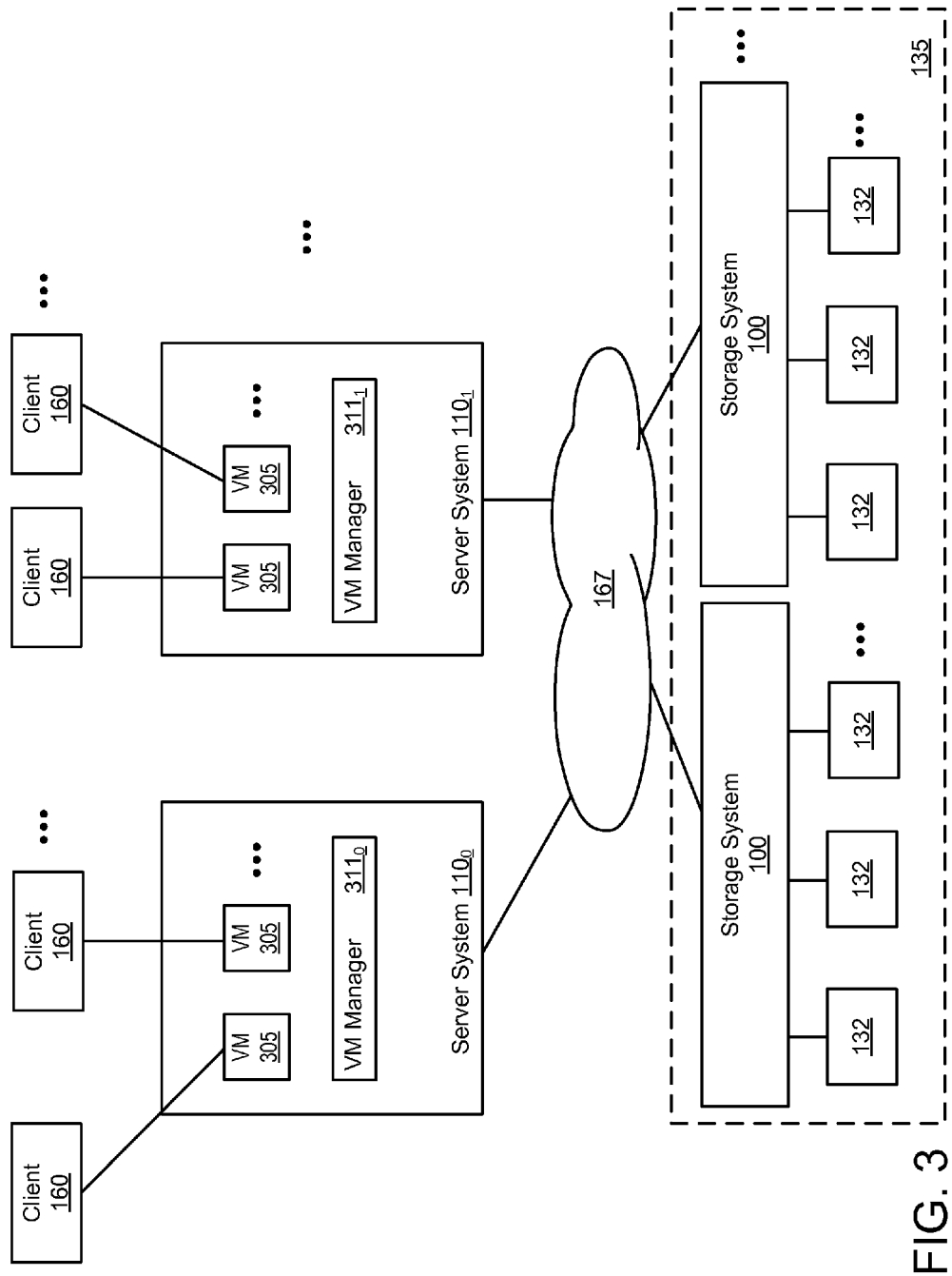
FIG. 3 shows a conceptual diagram of a virtual server environment comprising a plurality of physical servers accessing a storage system.

In some embodiments, the storage system 100 is used in a virtual server environment. FIG. 3 shows a conceptual diagram of a virtual server environment comprising a plurality of clients 160 and a plurality of physical servers $110_0$, $110_1$ ... $110_N$ accessing a plurality of storage systems 100 (comprising a cluster 135). Each storage system 100 may include a set of storage devices 130 (not shown) storing a set of storage objects 132 (e.g., volumes logical units (LUs), q trees, etc.) for storing data of an application 112. For illustrative purposes, in the embodiments discussed below, an application 112 comprises a virtual-based application, such as a virtual machine (VM). However, embodiments described below may also apply to an application 112 comprising a non-virtual based application.

Each server 110 may include one or more VM 305 (VMs) that reside and execute on the server 110. A VM may be referred to as a virtual-based application or "virtual application." Each VM 305 may comprise a separate encapsulation or instance of a separate operating system and one or more applications that execute on the server. As such, each VM 305 on a server 110 may have its own operating system and set of applications and function as a self-contained package on the server and multiple operating systems may execute simultaneously on the server.

Each VM 305 on a server 110 may be configured to share the hardware resources of the server. Each server may also include a VM manager module/engine 311 that executes on the server to produce and manage the VMs. The VM manager module/engine 311 may also virtualize the hardware and/or software resources (including virtual storage components) of the servers for use by the VMs 305. The operating system of each VM may utilize and communicate with the resources of the server via the VM manager.

The virtual server environment may also include a plurality of clients 160 connected with each server 110 for accessing client data stored on the storage system 100. Each client 160 may connect and interface/interact with a particular VM 305 of a server 110 to access client data of the storage system. From the viewpoint of a client 160, the VM 305 may comprise a virtual server that appears and behaves as an actual physical server or behaves as an actual desktop machine.

A storage system 100 may be configured to allow servers 110 to access its data, for example, to read or write data to the storage system. A server 110 may execute an application that "connects" to the storage system over a computer network 167 to send an access request (read or write request) to the storage system for accessing particular data stored on the storage system. Each server 110 may also include multiple VMs, each VM 305 being used by and connected with a client 160 through a computer network. Each VM 305 may also execute an application for sending read/write requests (received from the connected client 160) for accessing data on the storage system. The VM applications executing on the server may service the connected clients 160 by receiving the client access requests and submitting the access requests to the storage system 100 for execution.

Typically, different types of VM manager modules/engines 311 may be used (e.g., VMware™ ESX, Microsoft™ Hyper-V, etc.). Each different type of VM manager may produce a different type of VM using a different type of virtual storage component. In particular, a first VM produced by a first type of VM manager (e.g., VMware™ ESX) may have different attributes than a second VM produced by a second type of VM manager (e.g., VMware™ Microsoft™ Hyper-V). As such, the attributes of a VM may differ depending on the type of VM manager module/engine used to produce the VM. In addition, a first set of virtual storage components allocated to the first VM may have different attributes than a second set of virtual storage components allocated to the second VM. As such, the organization and mapping of a VM 305 to its virtual storage components (on the server 110) to its underlying storage objects 132 (on the cluster 135) may differ depending on the type of VM manager module/engine used to produce the VM and virtual storage components.

B. Server Components

Figure 4:
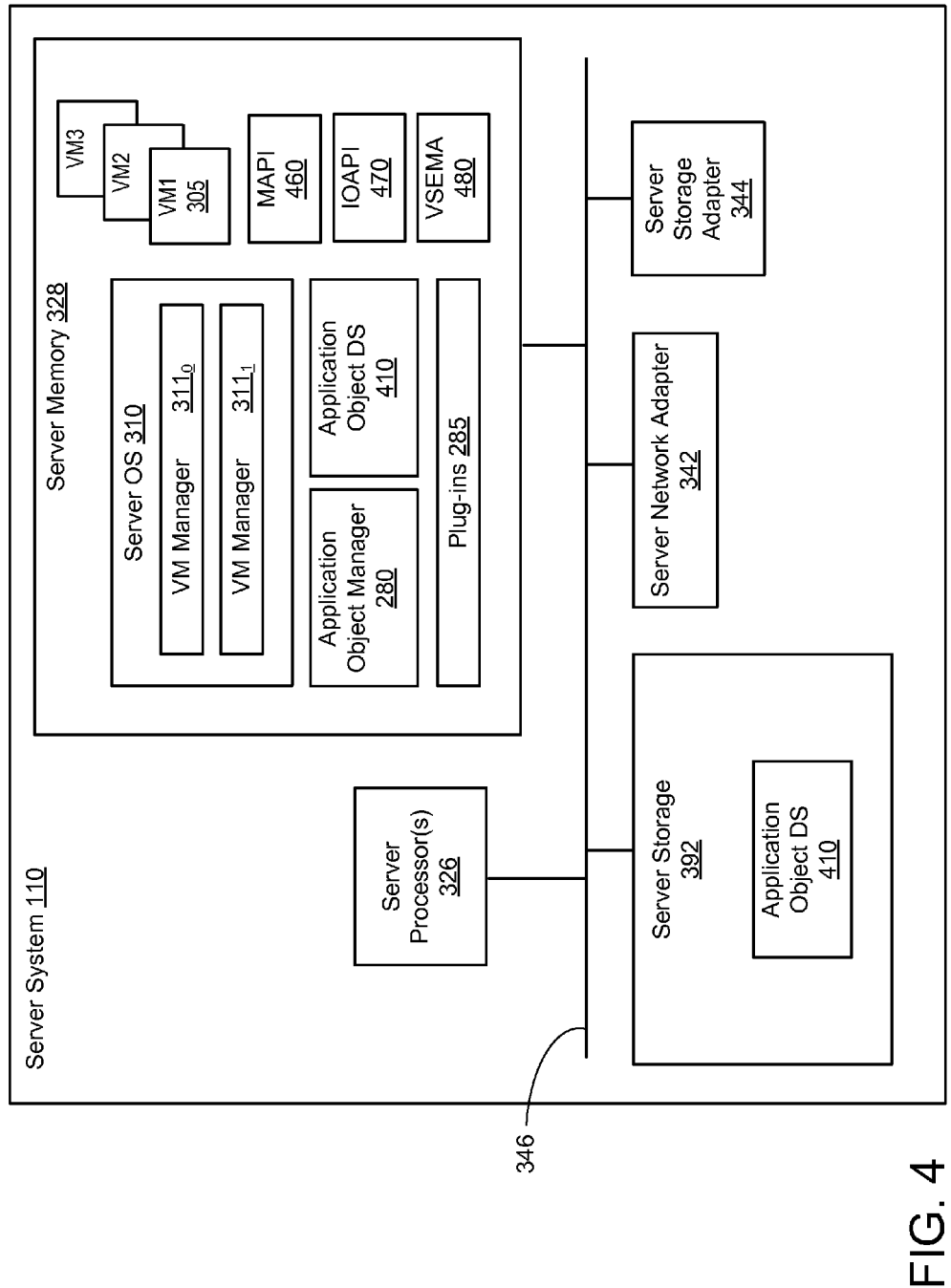
FIG. 4 is a diagram illustrating components of a server system within a virtual server environment.

FIG. 4 is a diagram illustrating components of a server system 110 within a virtual server environment. As shown in FIG. 4, a server system 110 may comprise one or more server processor(s) 326, server memory 328, one or more server network adapters 342, one or more server storage adapters 344, server storage 392, and other devices or peripherals (not shown) coupled to the processor by a bus 346.

The server processors are the central processing units (CPUs) of the server system 110 and, thus, control the overall operation of the server system 110. Server processors may include one or more programmable general-purpose or special-purpose microprocessors, digital signal processors (DSPs), programmable controllers, application specific integrated circuits (ASICs), programmable logic devices (PLDs), or the like, or a combination of such devices.

A server network adapter 342 may comprise mechanical, electrical, and signaling circuitry needed to connect the server system 110 to the network and to receive and transmit data over the network. The server network adapter 342 may comprise a network port controller (e.g., Ethernet cards), specialized network adapters, or any other physical device that controls the receiving and transmitting of data over a network. A server network adapter 342 may provide one or more network ports (i.e., data-access ports) for coupling the server system 110 to one or more other client systems 160 through a network 165. A connection with a client system 160 may be established using a network port of the server network adapter 342 to receive and transmit data though the network 165.

Server memory 328 comprises storage locations that are addressable by the processor and adapters (e.g., a server network), as well as other devices for storing software program code such as the software described herein. The server processor and server adapters may, in turn, comprise processing elements and/or logic circuitry configured to execute the software code. Server memory 328 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

Server memory 328 is for storing software program instructions and data structures such as a server operating system 310, an application object manager module/engine 280, one or more virtual machines 305, an application object data structure 410, a management application programming interface (MAPI) 460, an input/output application programming interface (IOAPI) 470, and a virtual server environment monitoring application (VSEMA) 480.

The server operating system 310 may be, for example, UNIX®, Windows NT®, Linux®, or any other operating system. The server operating system 310 may further include components discussed above in relation to FIG. 1B, such as mount daemon 166, Fibre Channel (FC) driver 168, TCP/IP 162, Network File System (NFS) layer 164 (not shown). A server system 110 loads information, instructions, par, and data structures into server memory 328 from which they are accessed and executed or processed by server processors 326 via a bus 346.

The VM manager module/engine 311 may comprise any module/engine capable of producing and configuring VMs. The server operating system 310 may comprise one or more different types of VM manager modules $311_0$, $311_1$, etc. (e.g., VMware™ ESX, Microsoft™ Hyper-V, etc.). The different types of VM manager modules 311 may produce different types of VMs 305.

Server storage 392 may comprise a local writable storage device, such as disk devices, video tape, optical devices, DVD, magnetic tape, flash memory, Magnetic Random Access Memory (MRAM), Phase Change RAM (PRAM), or any other similar media adapted to store information (including data and parity information). As shown in the example of FIG. 4, server storage 392 may store VM data and the application object data structure 410.

A VM 305 may be represented by data that describes the VM (referred to herein as "VM data"). In the example shown in FIG. 4, the server storage 392 may store VM data for one or more VMs 305. VM data may be stored and used later for producing and deploying the VM 305 represented by the VM data on a server 110. In some embodiments, VM data for a VM specifies hardware and/or software resources on a server and/or storage system that the VM uses during operation. As such, a VM may be viewed as being composed of the specified hardware and/or software resources.

The VM data for a VM may comprise a set of one or more VM files that describes hardware and/or software resources used by the VM. For example, the VM data may specify one or more virtual storage components that the VM uses, such as one or more virtual hard disks (VHDs), one or more datastores, and/or one or more virtual machine disks (VMDKs). The VM data may also comprise a VM configuration file specifying various components that the VM uses, such as an operating system, network adaptor, IP address, hard disks, etc.

In some embodiments, an application object manager module/engine 280 may reside and execute on the server 110 for performing embodiments described herein. The application object manager module/engine 280 may be configured to do so automatically, without human initiation, interaction, or intervention. In some embodiments, the application object manager module/engine 280 may comprise a software module or hardware engine that resides and executes on a server 110 hosting VMs 305. In other embodiments, the application object manager module/engine 280 may reside on a storage system 100 or on a server 110 that does not host VMs 305 and is dedicated for executing the application object manager module/engine 280. In further embodiments, the application object manager module/engine 280 may be executed by a VM 305 dedicated for executing the application object manager module/engine 280. The application object manager module/engine 280 may be referred to as a host service module/engine.

The application object manager module/engine 280 may be configured to operate in conjunction with other software modules of the server system 110 and software modules of the storage system 100 to collectively perform the embodiments described herein. For example, the application object manager module 280 may use functions of a management application programming interface (MAPI) 460 to perform some embodiments described herein. The management application programming interface may be configured for managing and configuring hardware and software components on the server (such as system and network devices). An example of a management application programming interface is the Windows Management Instrumentation® (WMI) program that is typically included in current Windows® operating systems.

The application object manager module 280 may also use functions of an input/output application programming interface (IOAPI) 470 to perform some embodiments described herein. The input/output application programming interface may be configured for sending low-level commands to hardware devices (such as storage devices), the commands being at a level lower than a file system read/write command. An example of a management application programming interface is the Windows IOCTL (DeviceIoControl) API program The application object manager module 280 may further use functions of a virtual server environment monitoring application (VSEMA) 480 to perform some embodiments described herein. The VSEMA 480 may be configured for monitoring objects comprising hardware and/or software components throughout a virtual server environment, including VMs 305 and storage objects 132. Objects for monitoring may be added to a database of the VSEMA 480 to initiate monitoring of the objects. In some embodiments, the application object manager module 280 may add at least one VM and its corresponding storage objects 132 to the database as objects for monitoring. An example of the VSEMA 480 is the Microsoft System Center Operations Manager® (SCOM) application for monitoring storage system environments.

In some embodiments, the application object manager module/engine 280 may be configured to operate in conjunction with one or more plug-ins 285 to collectively perform the embodiments described herein. In these embodiments, different types of plug-in 285 may be installed and used for different types of VM managers 311. Each plug-in 285 may be configured specifically for a particular type of VM manager 311 and comprise an interface between the VM manager 311 and the application object manager 280 to perform embodiments described herein. For example, a first type of plug-in 285 may be installed and used for a first type of VM manager (e.g., VMware™ ESX) and a second type of plug-in 285 may be installed and used for a second type of VM manager (e.g., VMware™ Microsoft™ Hyper-V).

C. Virtual Storage Components and Underlying Storage Objects

Figure 5:
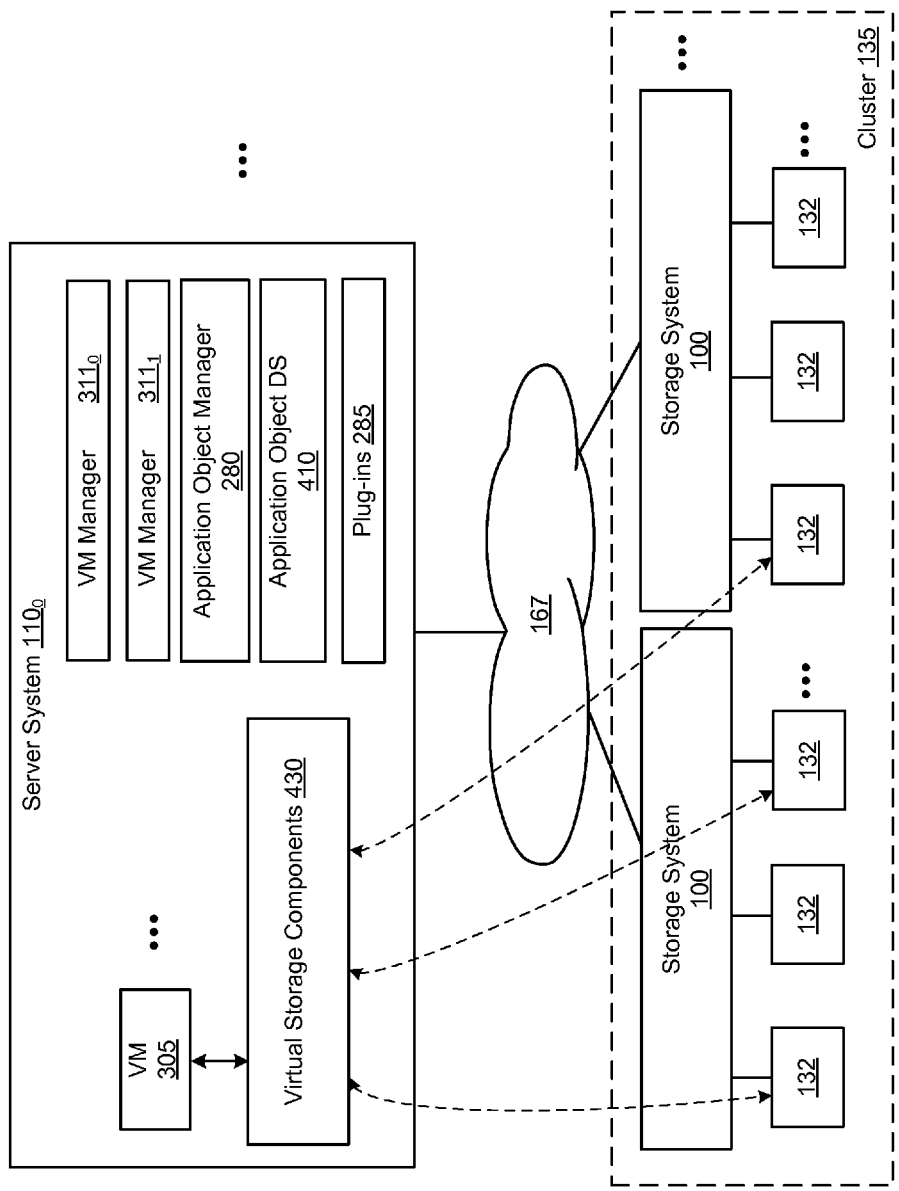
FIG. 5 shows a conceptual diagram of a virtual server environment having virtual storage components and underlying storage objects.

FIG. 5 shows a conceptual diagram of a virtual server environment having virtual storage components and underlying storage objects. As discussed above, the VM manager module 311 of a server 110 may virtualize the hardware and/or software resources for use by the VMs 305 of the server 110. For each server these resources may include storage objects 132 distributed on the one or more storage systems 100 of the cluster 135. Each storage system 100 may allocate its storage objects 132 to one or more physical servers 110, each allocated storage object being "mounted" (i.e., made available) to a particular physical server 110. For example, a storage system may allocate one or more logical units (LUs) to a physical server, each LU being mounted and made available to the physical server. As such, each physical server 110 may have one or more LUs available for use from one or more storage systems. A mounted storage object 132 may appear to the server 110 as a direct-attached physical storage device, such as a direct-attached Small Computer System Interface (SCSI) or Serial ATA (SATA) disk device.

Some or all storage objects 132 that are made available to a physical server may be virtualized by the VM manager 311 for use by the VMs. The VM manager module 311 may virtualize the storage objects 132 by producing virtual storage components 430 for use by the VMs 305 and virtual storage information that describes these virtual storage components 430. For each VM, the VM manager module may allocate one or more virtual storage components 430 for use by the VM. The virtual storage information may be used by a VM to locate and access its virtual storage component(s).

To a VM 305, each virtual storage component 430 may appear as a directly attached physical storage device (e.g., a drive or disk) that is directly accessed by the VM. But in fact, each virtual storage component 430 hosted on a server 110 is supported by an underlying corresponding storage object 132 residing somewhere on one of the storage systems 100 of the cluster 135 (as indicated by the dashed lines in FIG. 5).

D. Different Types of VM Managers

As discussed above, different types of VM manager modules/engines 311 may produce different types of VM (having different attributes) that use different types of virtual storage components. As such, the organization and mapping of a VM 305 to its virtual storage components (on the server 110) to its underlying storage objects 132 (on the cluster 135) may differ depending on the type of VM manager module/engine used to produce the VM and the virtual storage components. In the embodiments described below, examples are for a VM manager 311 comprising Microsoft™ Hyper-V or VMware™ ESX to illustrate the differences in virtual storage components between different types of VM managers 311. However, in other embodiments, another type of VM manager 311 may be used.

Figure 6:
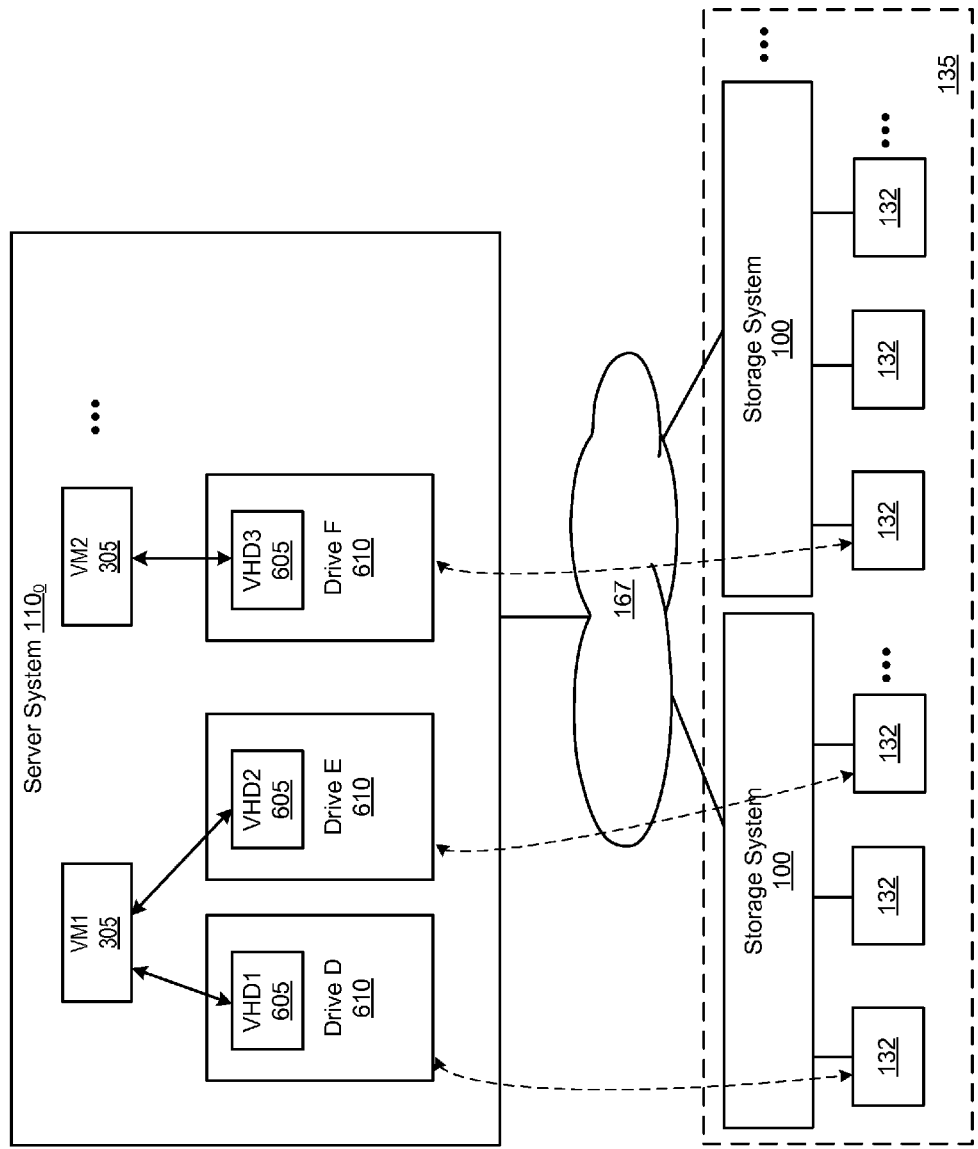
FIG. 6 shows a conceptual diagram of a virtual server environment using Hyper-V as a VM manager.

FIG. 6 shows a conceptual diagram of a virtual server environment using Hyper-V as a VM manager 311. In the example of FIG. 6, the virtual storage components 430 may include one or more virtual hard disks (VHDs) 605 with one or more configuration files, or one or more pass-through disks (PTDs). For illustrative purposes, the embodiments below may describe a virtual hard disk (VHD) 605. However, in other embodiments, other virtual storage components 430 may be used.

As known in the art, for a VHD 605, the server 110 may format an underlying storage object 132 with a file system, create a VHD file, and expose the VHD file to the VM 305 as a virtual hard disk. As used herein, the terms VHD and VHD file may sometimes be used interchangeably. Each VHD 605 may be allocated/assigned to a particular VM 305 for its data storage use.

Each VHD 605 may be located and reside on a particular local drive 610. Each local drive 610 may have a drive identifier (e.g., drive D, E, F, etc.) and/or volume mount point and a volume global Globally Unique IDentifier (GUID). Each local drive 610 may map to and be supported by an underlying storage object 132 on a storage system 100 of the cluster 135. For example, for a storage area network (SAN) environment, a storage object 132 may comprise a logical unit (LU).

As such, each VM 305 produced by the Hyper-V VM manager 311 may be allocated at least one VHD 605, each VHD 605 being deployed and residing on a local drive 610 on the server 110, each local drive 610 being mapped to an underlying storage object 132 on a storage system 100 of the cluster 135. Note that the VM 305, VHD 605, and local drive 610 are all hosted on the server 110 and the underlying storage objects 132 are hosted on the cluster 135. In some embodiments, the application object manager module/engine 280 may represent and/or describe an application object (e.g., VM 305, VHD 605, or local drive 610) in a standardized manner, the representation/description of the application object including its mappings to the underlying storage objects 132.

Figure 7:
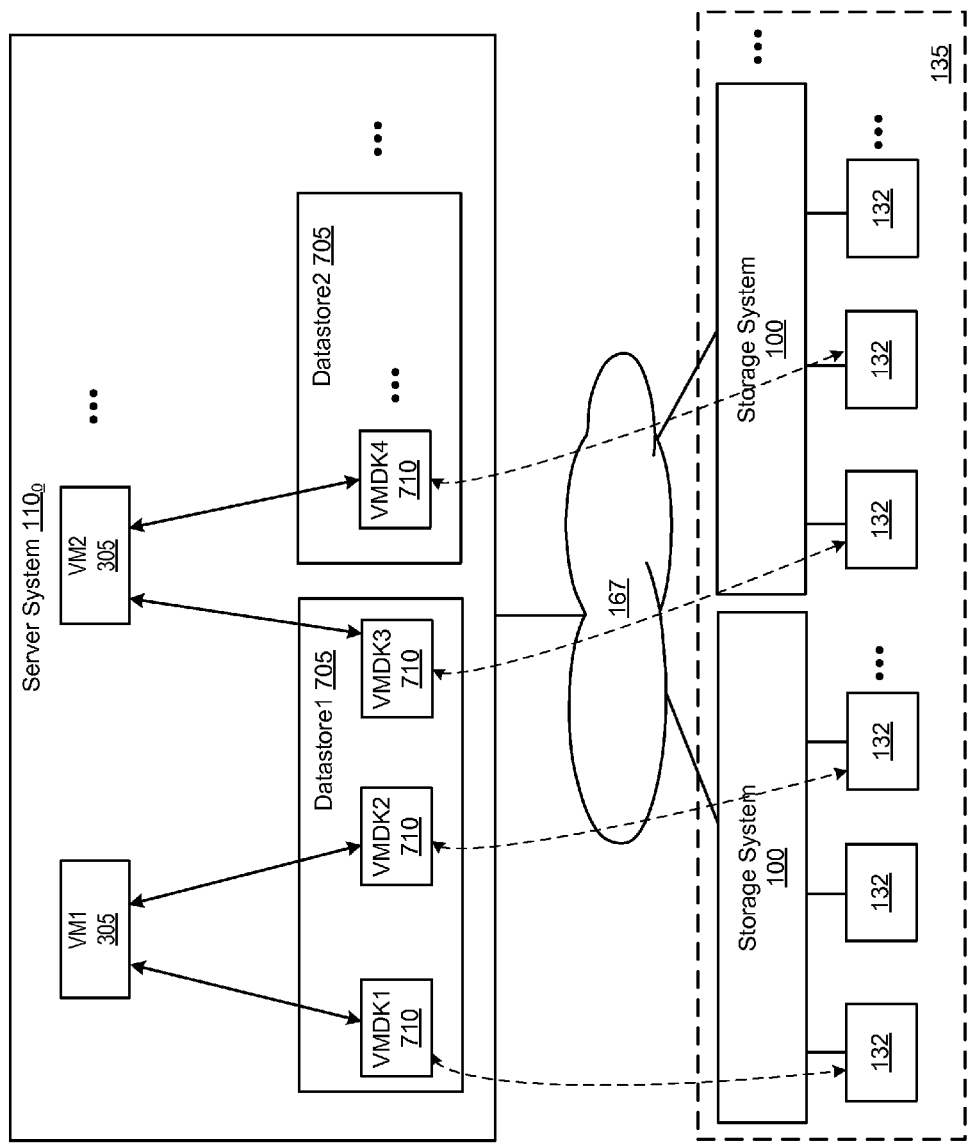
FIG. 7 shows a conceptual diagram of a virtual server environment using VMWare as a VM manager.

FIG. 7 shows a conceptual diagram of a virtual server environment using VMWare as a VM manager 311. In the example of FIG. 7, the virtual storage components 430 may include one or more datastores 705 and one or more virtual machine disks (VMDKs) 710. As known in the art, each datastore 705 comprises a collection of storage resources for use by one or more VMs 305. Each datastore 705 may comprise one or more VMDKs 710 that VMs 305 (on one or more servers 110) use for data storage, each VMDK 710 being allocated/assigned to a particular VM 305 for its data storage use. Each datastore 705 may reside on a particular server 110 but be shared by VMs across one or more servers 110. The VM manager 311 on the same server 110 as a datastore 705 may manage the datastore 705. Also, the VM manager 311 on a server 110 may manage those VMDKs allocated to the VMs deployed on the same server 110. In this manner, VMs may be quickly migrate between servers since the datastores for the VMs are already accessible by several servers.

As known in the art, a VMDK 710 comprises a disk image file. In turn, each VMDK 710 may map to and be supported by an underlying storage object 132 on a storage system 100 of the cluster 135. For example, for a storage area network (SAN) environment, a storage object 132 may comprise a logical unit (LU). For example, for a network attached storage (NAS) environment, a storage object 132 may comprise a volume.

As such, each VM 305 produced by the VMWare VM manager 311 may be allocated at least one VMDK 710 hosted on at least one datastore 705 on the server 110, each datastore 705 being mapped to one or more underlying storage objects 132 on a storage system 100 of the cluster 135. Note that the VM 305, datastore 705, and VMDK 710 are all hosted on the server 110 and the underlying storage objects 132 are hosted on the cluster 135. In some embodiments, the application object manager module/engine 280 may represent and/or describe an application object (e.g., VM 305, datastore 705, or VMDK 710) in a standardized manner, the representation/description of the application object including its mappings to the underlying storage objects 132

E. Standardized Application Objects

Figure 8:
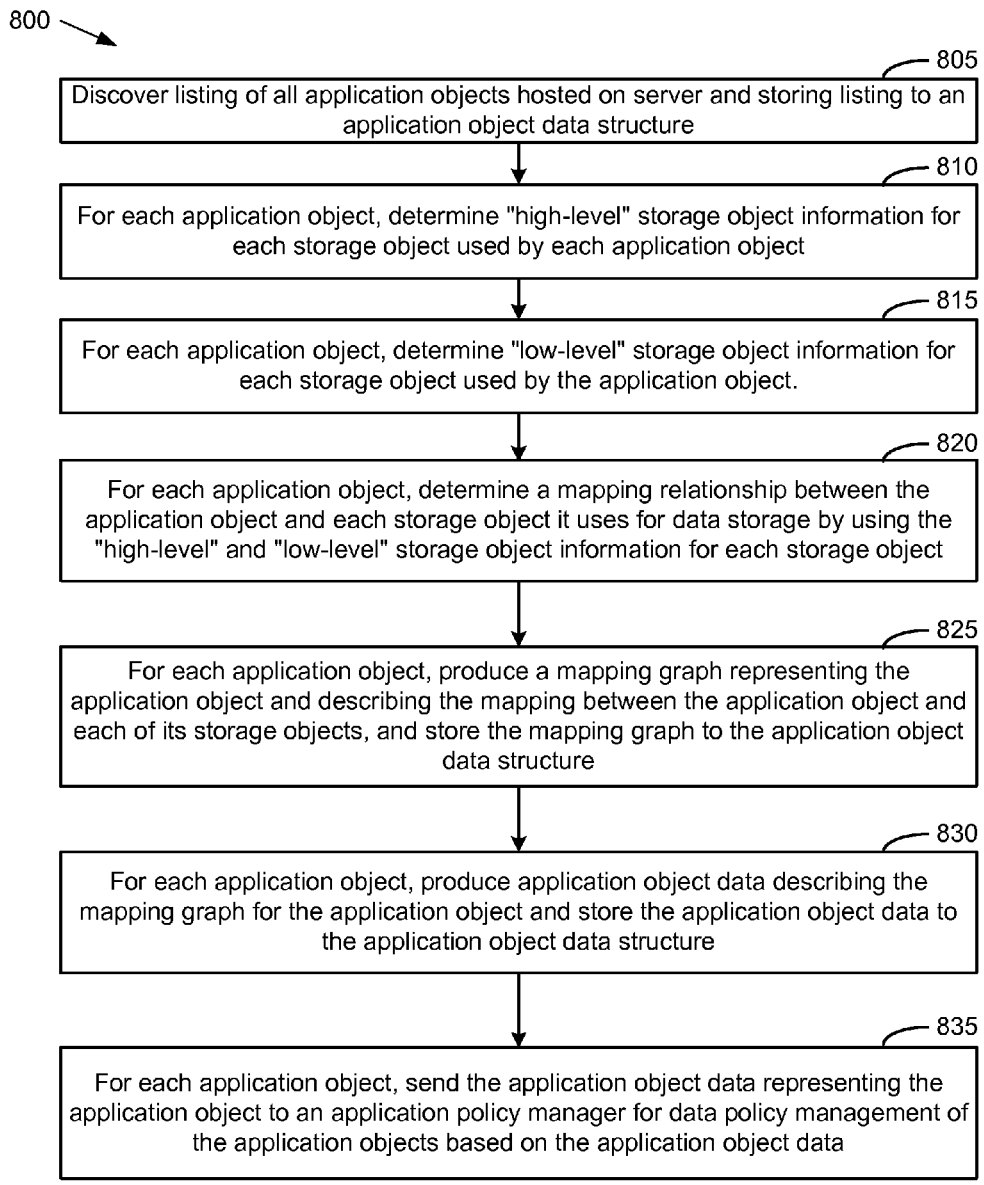
FIG. 8 is a flowchart of a method for representing application objects in a standardized manner, in accordance with some embodiments.

FIG. 8 is a flowchart of a method 800 for representing application objects in a standardized manner, in accordance with some embodiments. The method 800 of FIG. 8 is described in relation to FIGS. 9-11 which conceptually illustrate steps of the method 800. In some embodiments, the method 800 may be performed automatically, without human initiation, interaction, or intervention. The order and number of steps of the method 800 are for illustrative purposes only and, in other embodiments, a different order and/or number of steps are used. In some embodiments, some of the steps of the method 800 are performed or caused to be performed by an application object manager module/engine 280.

The application object manager module/engine 280 may be configured to operate in conjunction with modules/engines of the server system 110 and modules/engines of the storage system 100 to collectively perform the method 800. For example, the application object manager module/engine 280 may be configured to operate in conjunction with one or more plug-ins 285 to collectively perform the method 800. In these embodiments, a different type of plug-in 285 may be installed and used for each different type of application object manager 311. In some embodiments, the application object manager module/engine 280 and plug-in(s) 285 may reside and/or execute on a server 110, a storage system 100, a dedicated computer system, or any combination thereof.

In some embodiments, regardless of the type of application object manager 311 used, the method 800 may produce a representation/description of one or more application objects in a standardized manner, the representation/description of an application object including its mappings to the underlying storage objects 132. The method 800 may be initiated by and administrator or initiated automatically (e.g., on regular time intervals, when a new application object is deployed, etc.). The method 800 may be initiated for a particular server 110 to produce a representation/description of each application object being hosted on the server 110. The method 800 may then be repeated for each server 110.

The method 800 begins by discovering/determining (at 805) a listing of all application objects hosted and residing on the server 110 and storing the listing to an application object data structure 410. In some embodiments, the listing of application objects comprises a non-virtual application (e.g., email or database application), a virtual application (e.g., VM), or a virtual storage component used by a virtual application (e.g., datastore, VMDK, VHD, local drive, etc.), or any combination thereof.

In some embodiments, the listing of application objects may comprise a listing of unique identifiers of the application objects. For example, for an application object comprising a VM, when the VM is produced by the VM manager 311, the VM manager 311 may produce and assign a Globally Unique IDentifier (GUID) to each VM. For virtual storage components, each application may assign unique identifiers to its virtual storage components. For example, the method may determine (at 805) a listing of VMs using a management application programming interface (MAPI) 460 (such as Windows Management Instrumentation® (WMI)). For example, to request the application object listing, the method 800 may connect to the "\root\virtualization WMI namespace" and invoke "SELECT*FROM Msvm_ComputerSystem," whereby the response for this command lists the GUIDs of all VMs hosted and executing on the server. In other embodiments, the method may use other methods known in the art to determine the list of hosted application objects.

Also, the method 800 stores (at 805) the listing of discovered application objects to the application object data structure 410. FIG. 9 shows an exemplary application object data structure 410 used in some embodiments. In some embodiments, the application object data structure 410 comprises a plurality of application object entries 901, each entry 901 representing an application object. Each entry 901 may comprise a plurality of data fields for storing data describing the corresponding application object. In some embodiments, an application object entry 901 representing a application object may contain data fields for an application object identifier 905, a mapping graph 910, graph metadata 915, and graph data 920. At step 805, the method 800 may produce an entry 901 in the application object data structure 410 for each discovered application object, and store data for an application object identifier 905 for each entry 901. The application object identifier 905 may uniquely identify the application object in the server. In some embodiments, the plug-in(s) 285 discovers the application objects and identifiers and sends the information to the application object manager 280 which stores the received information to the application object data structure 410.

For each discovered application object, the method then determines (at 810), "high-level" storage object information for each storage object used by the application object. The "high-level" storage object information of a storage object may comprise information used by the application object to locate and access a virtual storage component (allocated for use by the application object) that corresponds and maps to the storage object. As such, the "high-level" storage object information may provide a mapping from the application object to a virtual storage component corresponding to the storage object. The "high-level" storage object information may comprise information used and understood by software and/or hardware components on the server 110 to locate storage objects. In some embodiments, the plug-in(s) 285 determines the "high-level" storage object information and sends the information to the application object manager 280.

For example, for an application object comprising a VM, the "high-level" storage object information may comprise virtual storage component information that describes virtual storage components 430 allocated to the VM. As discussed above, the virtual storage information may be used by the VM to locate and access its virtual storage component(s). For example, for each storage object of a VM, the "high-level" storage object information may comprise an identifier for a datastore and an identifier for a VMDK (in a VMWare environment), or may comprise an identifier for a VHD an identifier for a local drive (in a Hyper-V environment).

For example, for an application object comprising a datastore, the "high-level" storage object information may comprise identifiers of one or more VMDKs 710 hosted by the datastore. Note that each datastore comprises a pool of storage resources and hosts VMDKs and builds from VMDKs. For an application object comprising a VMDK, the "high-level" storage object information may comprise the identifier of the VMDK itself. For example, for an application object comprising a VHD, the "high-level" storage object information may comprise an identifier of a VHD file (hosted on a file system) that the VHD hosts on. For an application object comprising a local drive, the "high-level" storage object information may comprise the identifier of the local drive itself For each discovered application object, the method also determines (at 815), "low-level" storage object information for each storage object used by the application object. The "low-level" storage object information may comprise information used by a storage system 100 to locate and access a storage object corresponding to a virtual storage component used by the application object. As such, the "low-level" storage object information may provide a mapping from an application object's virtual storage components to its underlying storage objects. The "low-level" storage object information may comprise information used and understood by software and/or hardware components on the storage system 100 to locate storage objects corresponding to virtual storage components and may indicate the physical storage location of the storage objects on a storage system 100. In some embodiments, the application object manager 280 determines the "low-level" storage object information.

For example, the "low-level" storage object information for a storage object may comprise an identifier for a virtual storage component and an identifier for a storage system 100 and an identifier for a logical unit (LU) on the storage system 100, the logical unit comprising the storage object that corresponds to and underlies the virtual storage component. For example, the "low-level" storage object information for a storage object may comprise an identifier for a virtual storage component and an identifier for a storage system 100 and an identifier for a volume on the storage system 100, the volume comprising the storage object that corresponds to and underlies the virtual storage component.

For each application object, the method 800 then determines (at 820) a mapping relationship between the application object and each storage object it is allocated and uses for data storage. The method 800 may do so using the "high-level" and "low-level" storage object information for each storage object of an application object. In particular, for each storage object, the method 800 may combine the "high-level" storage object information (which maps the application object to a virtual storage component) with the "low-level" storage object information (which maps the virtual storage component to its underlying storage object) to produce a mapping between the application object and its underlying storage objects. In other embodiments, other methods may be used to determine a mapping between the application object and its underlying storage objects.

For each application object, the method 800 then produces (at 825) a mapping graph representing the application object and describing the mapping between the application object and each of its underlying storage objects, and stores the mapping graph to the application object data structure 410.

Figure 10:
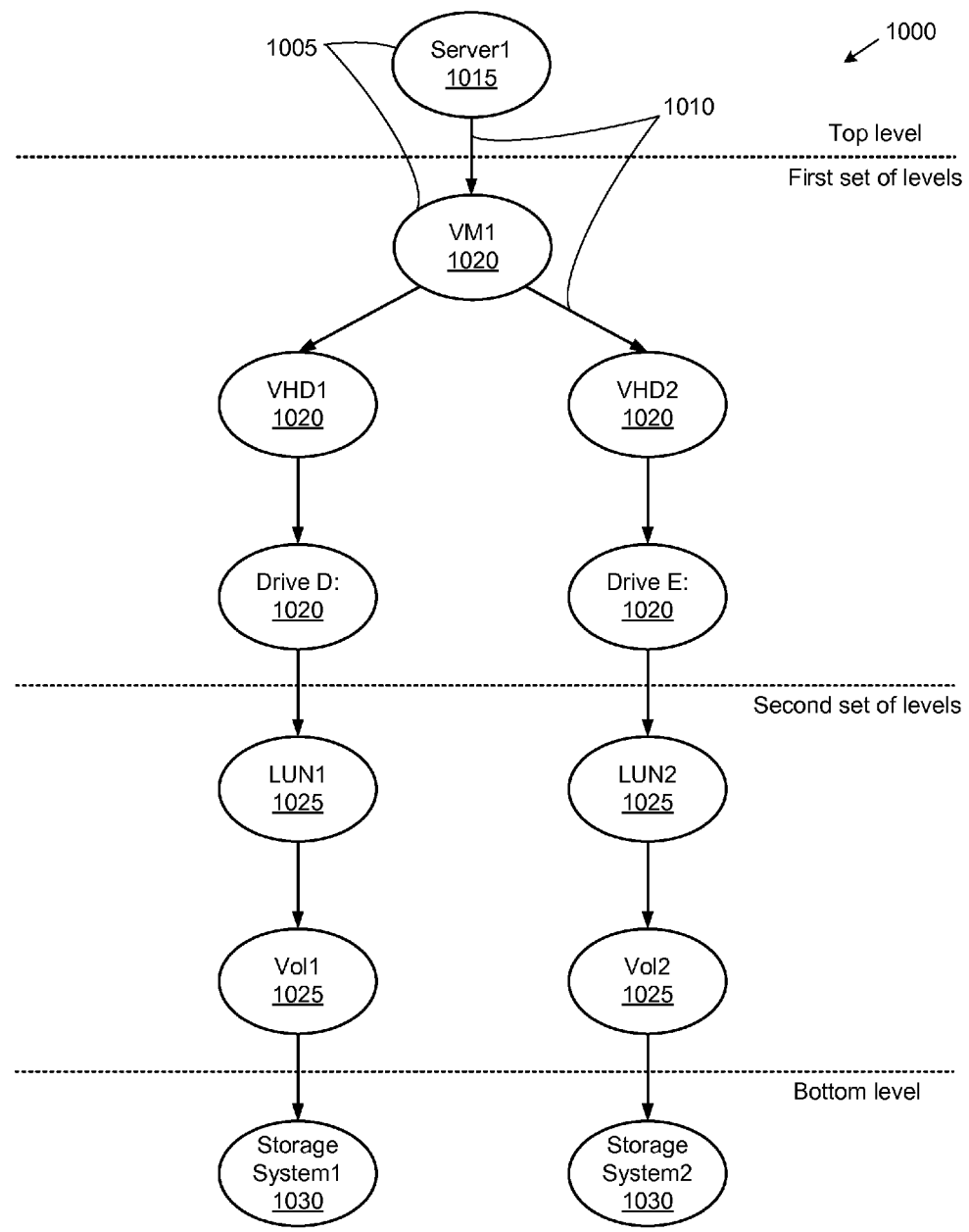
FIG. 10 shows a conceptual diagram of an exemplary mapping graph representing an application object in a Hyper-V environment.

FIG. 10 shows a conceptual diagram of an exemplary mapping graph 1000 representing an application object in a Hyper-V environment. In the example of FIG. 10, the application object comprises a VM. In other embodiments, the application object may comprise a VHD or local drive. As shown in FIG. 10, the mapping graph 1000 comprises a plurality of nodes 1005 interconnected by a plurality of connectors/edges 1010. The mapping graph 1000 may comprise a plurality of node pairs in parent/child relationships, each node pair comprising a parent node 1005 and a child node 1005 connected by a connector/edge 1010. The nodes 1005 may be arranged in a plurality of hierarchical levels indicating the parent/child relationships of the node pairs. A node 1005 may represent a server 110 (that hosts the represented application object), an application object, a storage object, or a storage system (that contains a storage object in the mapping graph 1000).

A top hierarchical level of the mapping graph 1000 may comprise a top server node 1015 representing a server 110 that hosts the application object represented by the mapping graph 1000. Below the top hierarchical level, the mapping graph 1000 may comprise a first set of hierarchical levels comprising one or more levels of application object nodes 1020 representing the application object and related application objects residing on the server 110. The first set of hierarchical levels may include an application object node 1020 that represents the application object for which the mapping graph is produced, as well as application object nodes 1020 that represent related application objects, such as virtual storage components that the application object uses. As shown in the example of FIG. 10, the first set of levels comprises a parent node 1020 representing a VM (VM1), the parent node 1020 having a first child node 1020 representing a first VHD (VHD1) and a second child node 1020 representing a second VHD (VHD2). The first set of levels also comprises a child node 1020 for each VHD node for representing a local drive (e.g., Drive D and Drive E) that the VHD is located on.

Below the first set of hierarchical levels, the mapping graph 1000 may also comprise a second set of hierarchical levels comprising one or more levels of storage object nodes 1025 representing the storage objects that the application objects represented in the first set of hierarchical levels map to. As shown in the example of FIG. 10, the second set of levels comprises a child node 1025 for each local drive node 1020 for representing a logical unit (e.g., LUN1 and LUN2) that the local drive maps to. The second set of levels may also comprise a child node 1025 for each logical unit node 1025 for representing a volume (e.g., VOL1 and VOL2) that the logical unit maps to.

Below the second set of hierarchical levels, the mapping graph 1000 may also comprise a bottom hierarchical level comprising storage system nodes 1030 representing storage systems 100 containing the storage objects represented in the second set of hierarchical levels. As shown in the example of FIG. 10, the bottom level comprises a child node 1030 for each volume node 1025 for representing a storage system (e.g., StorageSystem1 and StorageSystem2) that stores the volume.

As such, the mapping graph 1000 represents an application object (e.g., VM) by representing/describing the mapping relationship between the application object and each of its storage objects. In particular, the mapping graph 1000 represents/describes the relationships between the server on which the application object resides, the relationships between the application object and its virtual storage components (e.g., VM1 is allocated virtual storage components VHD1, VHD2, local drive D:, and local drive E:), the mapping relationships between the virtual storage components (e.g., VHD1 is located on local drive D:), the mapping relationship between the virtual storage components and their underlying storage objects (e.g., VHD1 and local drive D: maps to volume1), and the storage system that stores the underlying storage objects (e.g., StorageSystem1 stores volume1).

Figure 11:
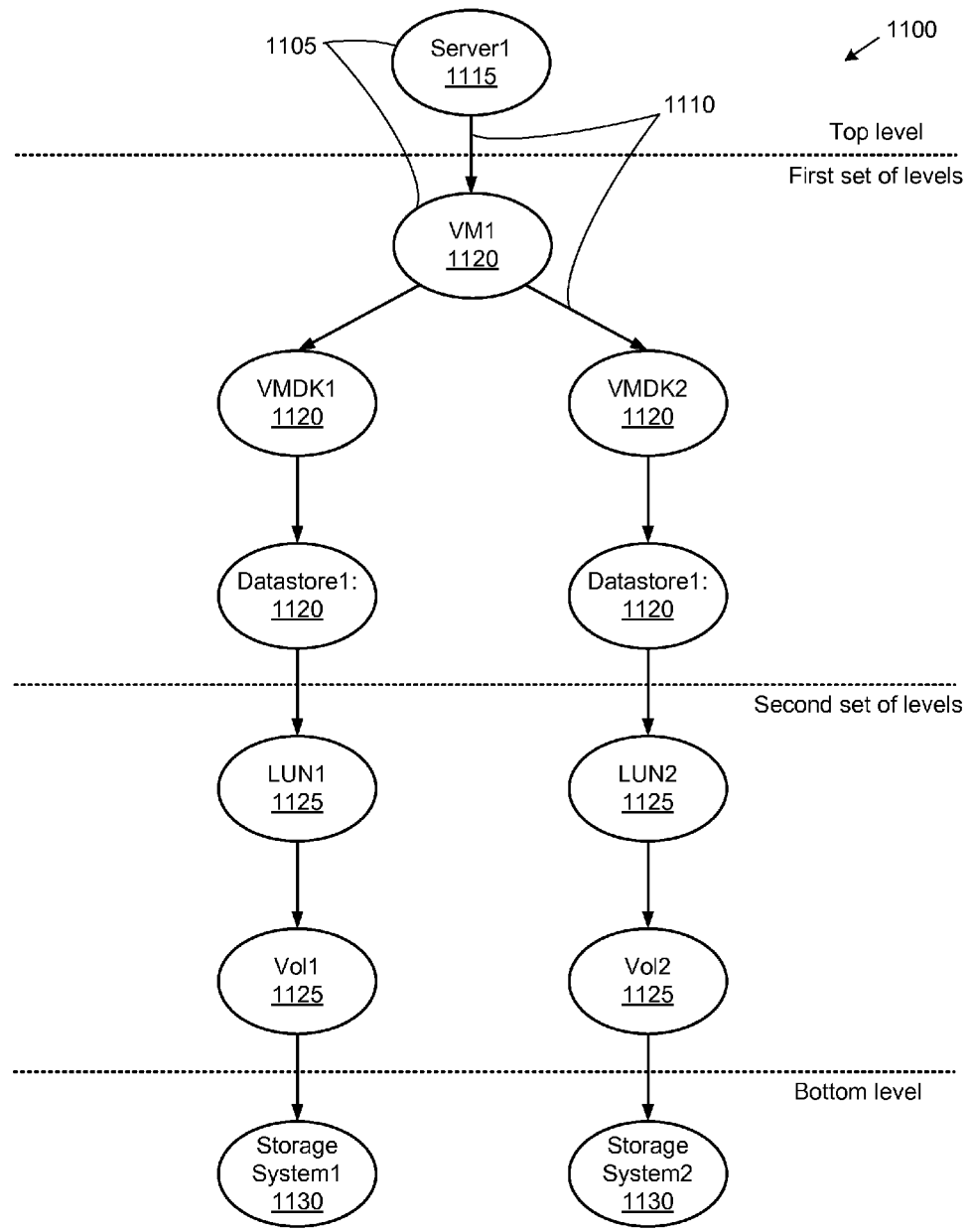
FIG. 11 shows a conceptual diagram of an exemplary mapping graph representing an application object in a VMWare environment.

FIG. 11 shows a conceptual diagram of an exemplary mapping graph 1100 representing an application object in a VMWare environment. In the example of FIG. 11, the application object comprises a VM. In other embodiments, the application object may comprise a datastore or VMDK. As shown in FIG. 11, the mapping graph 1100 comprises a plurality of nodes 1105 interconnected by a plurality of connectors/edges 1110. Some features of the mapping graph 1100 are similar to the features of the mapping graph 1000 of FIG. 10 and are not discussed in detail here.

A top hierarchical level of the mapping graph 1100 may comprise a top server node 1115 representing a server 110 that hosts the application object represented by the mapping graph 1100. Below the top hierarchical level, the mapping graph 1100 may comprise a first set of hierarchical levels comprising one or more levels of application object nodes 1120 representing application objects residing on the server 110. The first set of hierarchical levels may include an application object node 1120 that represents the application object for which the mapping graph is produced, as well as application object nodes 1120 that represent related application objects, such as virtual storage components that the application object uses. As shown in the example of FIG. 11, the first set of levels comprises a parent node 1120 representing a VM (VM1), the parent node 1120 having a child node 1120 representing each of its allocated VMDKs (VMDK 1 and VMDK2). The first set of levels also comprises child nodes for the VMDK nodes for representing datastores (e.g., datastore1) that host each VMDK.

Below the first set of hierarchical levels, the mapping graph 1100 may also comprise a second set of hierarchical levels comprising one or more levels of storage object nodes 1125 representing the storage objects that the application objects represented in the first set of hierarchical levels map to. As shown in the example of FIG. 11, the second set of levels comprises a child node for each datastore node for representing a logical unit (e.g., LUN1 and LUN2) that the datastore maps to. The second set of levels may also comprise a child node for each logical unit node for representing a volume (e.g., VOL1 and VOL2) that the logical unit maps to.

Below the second set of hierarchical levels, the mapping graph 1100 may also comprise a bottom hierarchical level comprising storage system nodes 1130 representing storage systems 100 containing the storage objects represented in the second set of hierarchical levels. As shown in the example of FIG. 11, the bottom level comprises a child node for each volume node for representing a storage system (e.g., StorageSystem1 and StorageSystem2) that stores the volume.

As such, the mapping graph 1100 represents an application object (e.g., VM) by representing/describing the mapping relationship between the application object and each of its storage objects. In particular, the mapping graph 1100 represents/describes the relationships between the server on which the application object resides, the relationships between the application object and its virtual storage components (e.g., VM1 is allocated virtual storage components datastore1, VMDK1, and VMDK2), the mapping relationships between the virtual storage components (e.g., VMDK 1 and VMDK2 are hosted on datastore1), the mapping relationship between the virtual storage components and their underlying storage objects (e.g., datstore1 maps to volume1 and volume2), and the storage system that stores the underlying storage objects (e.g., StorageSystem1 stores volume1).

For each application object, the method 800 also stores (at 825) each mapping graph 1000 (or a pointer to the mapping graph 1000) in the entry 901 for the application object in the application object data structure 410. As shown in FIG. 9, each entry 901 for an application object includes a mapping graph field 910 for storing a mapping graph of the application object, the mapping graph field 910 comprising data describing the mapping graph 910 or a pointer to the mapping graph 910.

For each application object, the method 800 then produces (at 830) application object data describing the mapping graph (produced for the application object) and stores the application object data to the application object data structure 410. The application object data may be used by an application policy manager to manage data policies on the application object based on the application object data. The application object data may comprise graph metadata and graph data. In some embodiments, the graph metadata comprises information used by the application policy manager for understanding and properly processing the information contained in the graph data. As such, the graph metadata describes data in the graph data and the graph data describes the mapping graph.

In some embodiments, the graph metadata may specify 1) one or more types of application objects included in the mapping graph; 2) data policies that are permitted to be implemented on each type of application object; and/or 3) features of each type of application object included in the mapping graph. In other embodiments, the graph metadata may include other metadata for describing the graph data.

The graph metadata may specify types of application objects in terms of whether the application object is a type of non-virtual application, a virtual application, or virtual storage component. This indicates that the application policy manager will receive these types of application object types in the graph data. For virtual objects, the graph metadata may further specify types of application objects in terms of the type of VM manager used to produce the application objects. For example, for the mapping graph 1000 of FIG. 10, the graph metadata may specify the one or more types of application objects included in the mapping graph by specifying the application object types Hyper-V VM, VHD, and local drive. For example, for the mapping graph 1100 of FIG. 11, the graph metadata may specify the one or more types of application objects included in the mapping graph by specifying the application object types VMWare VM, datastore, and VMDK. As such, the application object type also indicates the type of VM manager used to produce the application objects.

Data policies that are permitted to be implemented on an application object may include, for example, policies for data backup, SLO management, RBAC management, etc. (as discussed below in Section IV). For each type of application object in the mapping graph, the graph metadata may specify zero or more data policies that are permitted to be implemented for each type of application object in the mapping graph. In some embodiments, the type of data policies that may be implemented may vary/differ depending on the type of application object. For example, a first set of one or more data policies may be permitted for a first type of application object and a second set of one or more data policies may be permitted for a second type of application object, the first and second sets being different sets of data policies.

Further, for VMs, the type of data policies that may be implemented may vary/differ depending on the type of VM manager 311 used to produce the VM. For example, the type of data policies that may be implemented may differ for a VM produced by a Hyper-V VM manager 311 and a VM produced by a VMWare VM manager 311. The type of data policies that are permitted to be implemented for each type of application object may be specified, for example, by an administrator or specified by default settings for each type of application object.

Features of each type of application object may comprise various characteristics of the application object type (depending on the application object type). A non-exhaustive list of examples of features for an application object type include maximum data size, creation date, modification date, date and time of last backup, etc.

For each application object, the method 800 also stores (at 830) the graph metadata to the application object data structure 410. As shown in FIG. 9, each entry 901 for an application object includes a graph metadata field 915 for storing graph metadata for the mapping graph. As shown in the example of FIG. 9, the graph metadata field 915 may store data specifying a first data policy permitted to be implemented on a first type of VM and a second data policy permitted to be implemented on a second type of VM, the first and second data policies being different data policies (e.g., SLO management is permitted for a Hyper-V VM and RBAC management is permitted for a VMWare VM).

In some embodiments, the graph data describes the various components of the mapping graph including descriptions of the nodes, connectors, and hierarchical relationships between the nodes. In some embodiments, for each node in the mapping graph, the graph data specifies 1) the type of node; 2) a node identifier; and/or 3) a node name. In other embodiments, the graph data may include other data for describing the mapping graph.

For 1) the type of node, the graph data may specify for each node, for example, a server node (representing a server 110), an application object node (representing an application object residing on the server 110), a storage object node (representing a storage object residing on a storage system 100), or a storage system node (representing a storage system 100). For each application object node, the graph data may further specify the type of application object represented by the application object node. Note that the graph data may specify the type of application object in terms of whether the application object is a type of non-virtual application, a virtual application, or virtual storage component. For virtual objects, the graph data may further specify types of application objects in terms of the type of VM manager used to produce the application objects, such as a Hyper-V VM, VHD, local drive, VMWare VM, datastore, VMDK, etc. For each storage object node, the graph data may further specify the type of storage object represented by the storage object node, such as logical unit or volume, etc.

For 2) the node identifier, the graph data may specify for each node, for example, an identifier of the node that uniquely identifies the node within the mapping graph for the node type and within all mapping graphs produced for the server. For example, the node identifier may be determined from the item it represents. For example, for a server node representing a server 110, the node identifier may comprise the server identifier. For an application object node representing an application object, the node identifier may comprise the application object identifier which may vary depending on the application object type. In some embodiments, for example, the VM manager module/engine may determine or assign a unique identifier for each application object and application object node. For a storage object node representing a storage object, the node identifier may comprise the storage object identifier. The storage object identifier may be unique for the storage object type and can be used to locate the storage object in the cluster. The storage object identifier may vary depending on the storage object type. For example, for a logical unit, the storage object identifier may comprise its serial number, for a volume the storage object identifier may comprise its GUID, etc. For a storage system node representing a storage system, the node identifier may comprise the storage system identifier. In other embodiments, other methods are used to determine unique identifiers for the nodes.

For 3) the node name, the graph data may specify for each node, for example, a name of the node specified by a user or administrator for the item the node represents. For example, the node name may comprise a server name, application object name, storage object name, or storage system name that has been specified by a user or administrator for the server, application object, storage object, or storage system that the node represents.

Also, the graph data may also describe the hierarchical relationships between the nodes in the mapping graph. For example, the hierarchical relationships may be described in terms of node pairs in parent/child relationships, each node pair specifying a parent node and a child node. As such, the mapping graph may be described by a plurality of node pairs in parent/child relationships. In other embodiments, other methods are used to describe the hierarchical relationships between the nodes in the mapping graph.

For each application object, the method 800 also stores (at 830) the graph data to the application object data structure 410. As shown in FIG. 9, each entry 901 for an application object includes a graph data field 920 for storing graph data for the mapping graph. As shown in the example of FIG. 9, the graph data field 920 may store, for each node in mapping graph, 1) node type; 2) node identifier; and 3) node name. In other embodiments, other data describing each node may also be stored in the graph data field 920. The graph data field 920 may also store data describing a plurality of node pairs in parent/child relationships showing hierarchical relationships between the nodes.

For each application object, the method 800 then sends (at 835) the application object data (comprising graph metadata and graph data) representing the application object to the application policy manager for data policy management of the application objects. For example, the data policies may include policies for backup, service level objectives, recovery, monitoring and/or reporting. For each application object, the application policy manager engine may apply one or more policies to the application object by applying the one or more policies to the underlying storage objects of the application object by using the application object data that specifies mappings to the underlying storage objects. The method 800 may do so by sending, for each application object, the graph metadata 915 and the graph data 920 (stored in the entry 901 for the application object in the application object data structure 410) to the application policy manager. In some embodiments, the method 800 sends the graph metadata 915 before sending the graph data 920, so that the application policy manager may use the graph metadata 915 to understand and properly process the graph data 920.

As described above, a standardized manner of representing/describing application objects may be provided by representing/describing application objects as mapping graphs. As such, use of the mapping graphs may provide a standardized manner for representing different types of application objects (e.g., regardless of the type of VM manager 311 used). In addition, a standardized manner for describing the mapping graph of an application object is provided by producing application object data (comprising graph metadata and graph data) describing the mapping graph, the application object data being formatted into a standardized formatted, as discussed above.

As such, the application object data represents/describes an application object in a standardized format that therefore may be easily processed by the application policy manager. In these embodiments, the mapping graph and application object data may be used to represent the application object to the application policy manager that manages data policies on the application object based on the mapping graph and application object data. Since the application object data is standardized, the application policy manager may process and manage the application objects in a similar manner, no matter the type of application object. The application policy manager is described below in Section IV.

IV. Application Policy Manager

Figure 12:
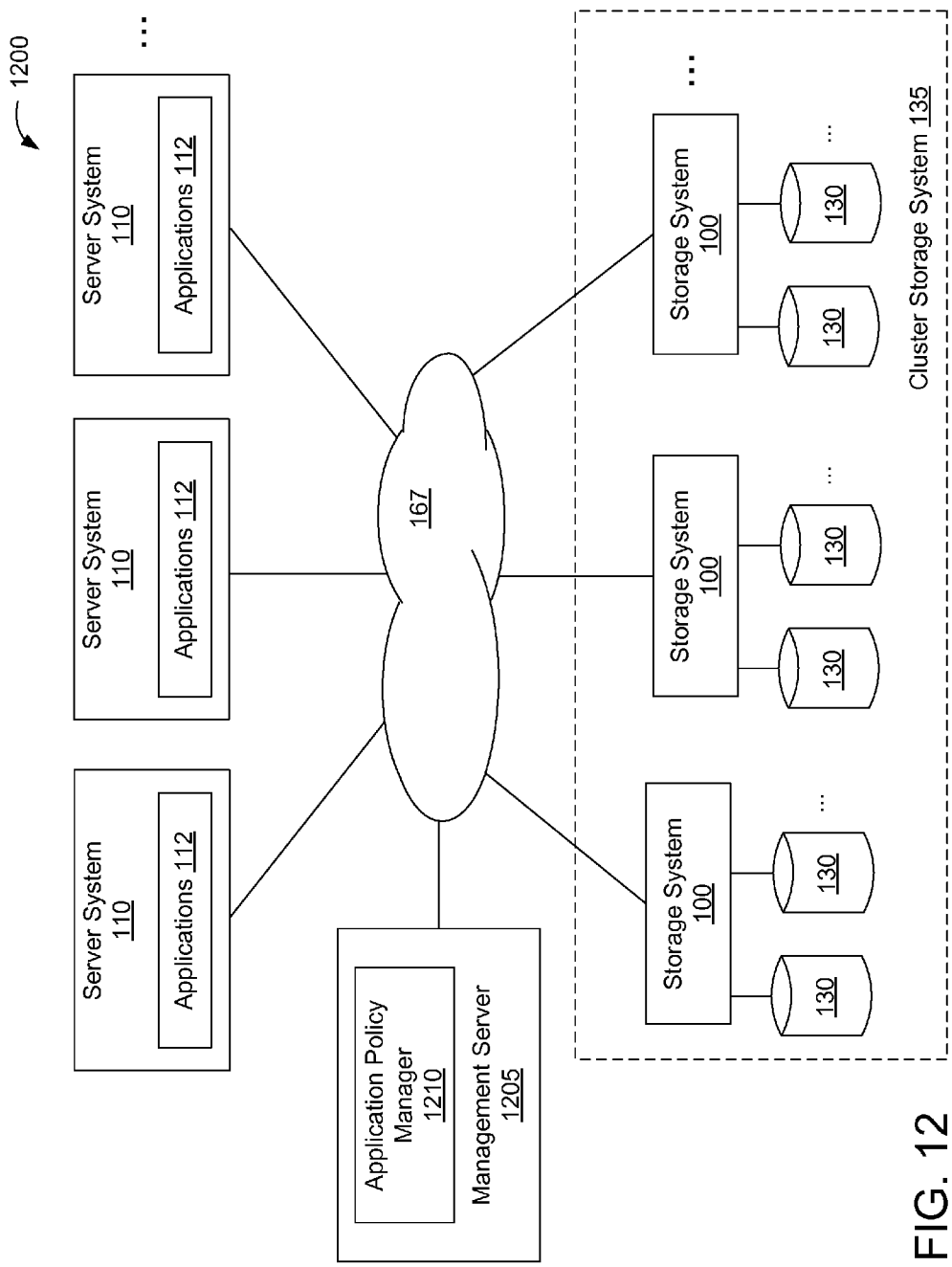
FIG. 12 is a schematic block diagram of an exemplary cluster storage system environment in which some embodiments operate.

FIG. 12 is a schematic block diagram of an exemplary cluster storage system environment 1200 in which some embodiments operate. The environment 1200 comprises a set of one or more server systems 110, a cluster 135 comprising a set of one or more storage systems 100, and a management server 1205 that are connected via a connection system 167. In other embodiments, the cluster 135 comprises a plurality of storage systems 100. Each storage system 100 comprises a set of one or more storage devices 130. The connection system 167 may comprise a network, such as a Local Area Network (LAN), Wide Area Network (WAN), metropolitan area network (MAN), the Internet, or any other type of network or communication system between computer systems.

Each storage system 100 may have a distributed architecture. For example, each storage system 100 may include separate N module (network module) and D module (data module) components (not shown). In such an embodiment, the N module is used to communicate with the server systems 110, while the D module includes the file system functionality and is used to communicate with the storage devices 130. In another embodiment, the storage server 108 may have an integrated architecture, where the network and data components are all contained in a single box or unit. The storage system 100 may be coupled through a switching fabric (not shown) to other storage systems 100 in the cluster 135. In this way, all the storage systems 100 of the cluster 135 may be interconnect to form a single storage pool that may be accessed by the connected server systems 110.

The storage systems 100 comprise functional components that cooperate to provide a distributed storage system architecture providing consolidated data services to the server systems 110. A server system 110 may comprise a computer system that utilizes services of the cluster storage system 135 to store and manage data in the storage devices 130 of the storage systems 100. Interaction between a server system 110 and a storage system 100 can enable the provision of storage services. That is, server system 110 may request the services of the storage system 100, and the storage system 100 may return the results of the services requested by the server system 110, by exchanging packets over the connection system 167. The server system 110 may request the services of the storage system by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The storage system 100 may comprise a computer system that stores data in a set of storage devices 130, preferably on one or more writable storage device media (such as magnetic disks, video tape, optical, DVD, magnetic tape, and any other similar media adapted to store information, including data and parity information). The storage system 100 may implement a file system to logically organize the data as storage objects on the storage devices 130. A storage system 100 or a server system 110 may execute one or more applications 112 (discussed above in Section III) that submit access requests for accessing particular storage objects on the storage devices 130.

Figure 13:
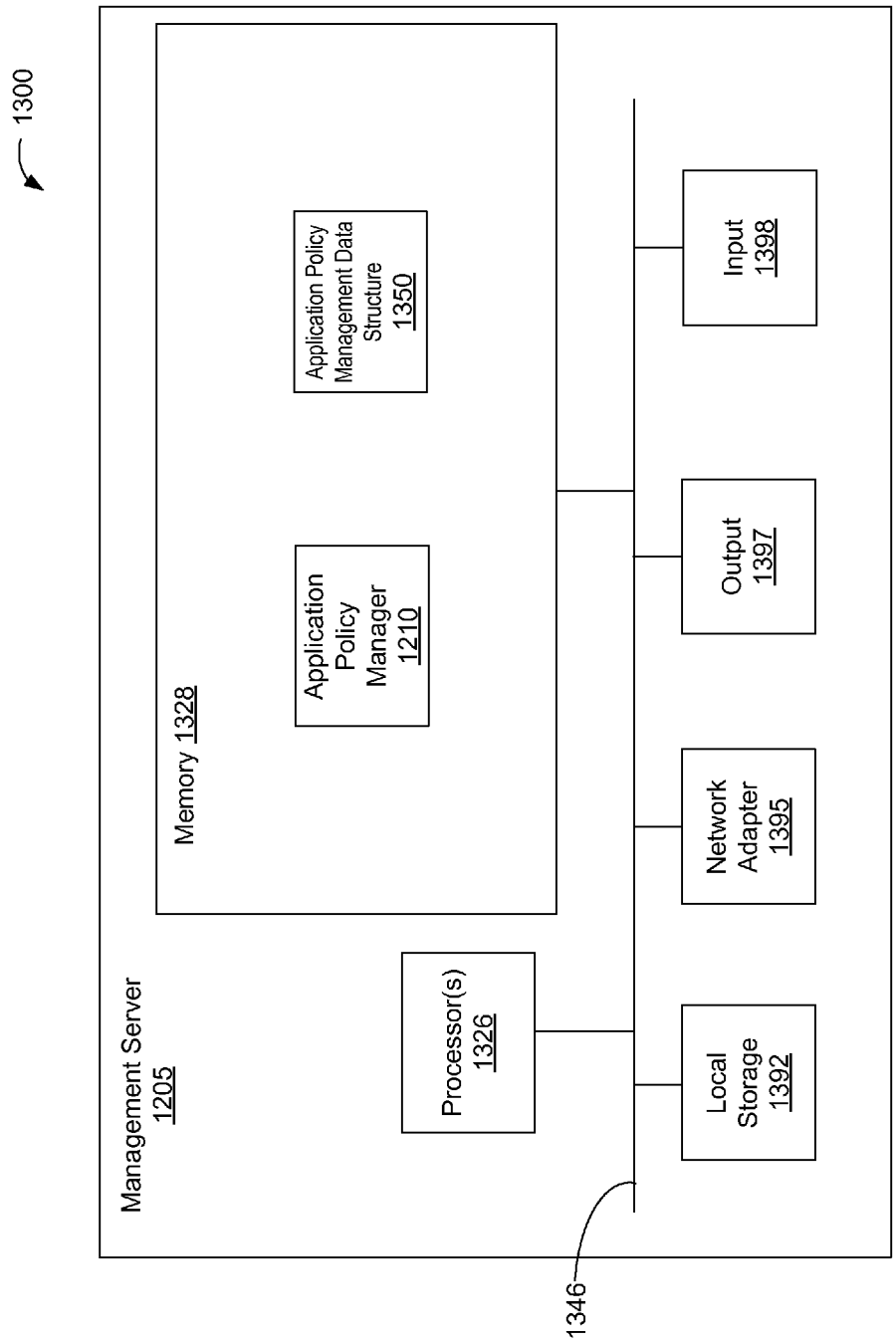
FIG. 13 is a schematic block diagram of an exemplary management server that may be employed in the cluster storage system environment of FIG. 1.

FIG. 13 is a schematic block diagram of an exemplary management server 1205 that may be employed in the cluster storage system environment of FIG. 12. The management server 1205 comprises server processor(s) 1326, server memory 1328, a server local storage 1392, a server network adapter 1395, an output component 1397, and an input component 1398 coupled by a bus 1346.

The server processors 1326 are the central processing units (CPUs) of the management server 1205 and, thus, control the overall operation of the management server 1205. Server processors 1326 may include one or more programmable general-purpose or special-purpose microprocessors, digital signal processors (DSPs), programmable controllers, application specific integrated circuits (ASICs), programmable logic devices (PLDs), or the like, or a combination of such devices. The server network adapter 1395 comprises a plurality of ports adapted to couple the management server 1205 to one or more other computer systems (such as servers 110 or storage systems 100) over point-to-point links, wide area networks, virtual private networks implemented over a public network (Internet) or a shared local area network. The server network adapter 1395 thus may comprise the mechanical, electrical and signaling circuitry needed to connect the storage system to the network.

The output component 1397 may be of any type generally used by a computer system to provide information to an end user (e.g., administrator). For example, the output component 1397 could include a monitor, an audio speaker, or an alphanumeric display. Similarly, the input component 1398 may be of any type that allows an end user to provide input into a computer system. For example, the input component 1398 may be a keyboard, a mouse, or a speech recognition system. In some embodiments, the input component 1398 may be used by an administrator inputting policy information or grouping datasets.

Server memory 1328 can be a random access memory (RAM), a read-only memory (ROM), or the like, or a combination of such devices. It will be apparent to those skilled in the art that other processing and memory means, including various computer readable media, may be used for storing and executing program instructions pertaining to the embodiments described herein. Server memory 1328 comprises storage locations that are addressable by the processor 1326 and adapters for storing software program code, such as software described herein. The server processor 1326 and server adapters may, in turn, comprise processing elements and/or logic circuitry configured to execute the software code. Such software code may include an application policy manager module 1210 and an application policy management data structure 1350. In some embodiments, the various modules may configure hardware components of the management server to produce an application policy manager module 1210 and an application policy management data structure 1350.

Server local storage 1392 is a storage device that stores data needed by the application policy management module 1210 and application policy management data structure 1350 for performing the embodiments described herein. Such data may include all application policies, application objects, and application datasets. The management server 1205 loads data stored on the server local storage 1392 into server memory 1328 from which they are accessed by server processors 1326. The server local storage 1392 may also store data produced by the application policy management module 1210 and application policy management data structure 1350 upon performing the embodiments described herein. For example, such data may include application policies and associated application datasets that need to be implemented.

In some embodiments, the application policy manager module 1210 and application policy management data structure 1350 for performing the embodiments described herein reside and execute on the management server 1205 which is external and separate from the server 110 and storage systems 100. In other embodiments, the application policy manager module 1210 and application policy management data structure 1350 may be distributed and reside and execute on one or more servers 110 and/or one or more storage systems 100.

The application policy manager module 1210 may be configured to associate at least one policy to each application object of a dataset and to each underlying storage object of each application object. In some embodiments, the application policy manager module 1210 may receive information about application objects and storage objects. The application policy manager module 1210 may group application objects into datasets based on the received information. The received information and the datasets may be stored into a data structure. The application policy manager module 1210 may assign a policy to each dataset and implement the policy on each application object of each dataset and each underlying storage object of each application object.

Figure 14:
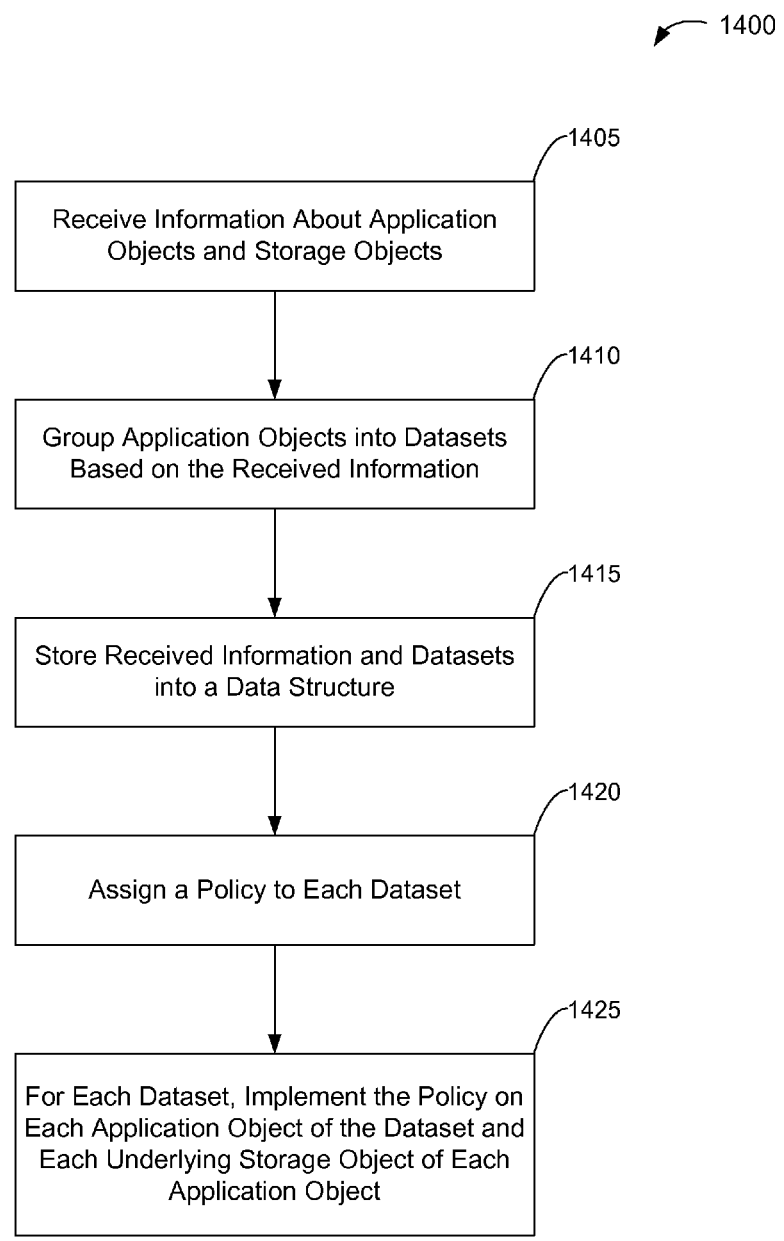
FIG. 14 is a is a flowchart of a method for managing application policies.

FIG. 14 is a flowchart of a method 1400 for managing application policies, in accordance with some embodiments. The method 1400 of FIG. 14 is described in relation to FIGS. 12, 13, and 15 which conceptually illustrate the steps of the method 1400. In some embodiments, the method 1400 may receive information about application objects and storage objects, group application objects into datasets based on the received information, store the received information and datasets into a data structure, assign a policy to each dataset, and/or implement the policy on each application object of a dataset and each underlying storage object of each application automatically, without human initiation, interaction, or intervention. In some embodiments, particular steps of the method 1400 may be performed automatically, without human initiation, interaction, or invention, while other steps of the method 1400 may be performed with human interaction. For example, in some embodiments, steps 1405, 1415, and 1425 may be performed automatically, without human initiation, interaction, or intervention, while steps 1410 or 1420 may be performed by human interaction, such as commands an administrator.

In some embodiments, some of the steps of method 1400 are performed or caused to be performed by an application policy manager module 1210 executing on a management server 1205. The application policy manager module 1210 may be configured to operate in conjunction with other software modules of the management server 12005, server system 110, and software modules of the storage system 100 to collectively perform the embodiments described herein.

The method 1400 begins by receiving (at step 1405) data about application objects and storage objects. The data may comprise all of the information that describes the application object. In some embodiments, the data about application objects and storage objects may be received from an application object manager 280. The data about application objects and storage objects may comprise, but is not limited to, identification information, mapping graph information to locate an underlying storage object (as described above in section III), type of application object, and attributes of an application object.

In some embodiments, an application object represents an application or a virtual storage component used by a virtual based application. An application object may comprise a virtual object or a non-virtual object. As such, an application object may comprise a virtual based application or a non-virtual based application. For example, an application object may comprise a virtual based application such as a virtual machine (VM) or a non-virtual based application such as an email application or database application.

As described above, in some embodiments, an application object may represent a virtual storage component used by a virtual based application. For example, an application object may represent a datastore. Thus, in some embodiments, an application object may represent a virtual application such as a VM, a non-virtual application such as an email or database application, and/or a virtual storage component such as a datastore.

The method 1400 may group (at step 1410) application objects into datasets based on the received data. In some embodiments, a dataset comprises at least two application objects. For example, a dataset may comprise a virtual based application and a non-virtual based application. In the same or an alternative embodiment, a dataset may comprise a virtual based application, a non-virtual based application, and a datastore. For example, a dataset may comprise a VM, a datastore used by the VM, and an email application. As such, a dataset may comprise any combination of virtual based applications, non-virtual based applications, and virtual storage components.

In some embodiments, the grouping of application objects into datasets is based on the received data. For example, the grouping of application objects may be based on the received data with regard to attributes of the application objects. As such, in some embodiments, application objects with similar attributes may be grouped together into the same dataset. In some embodiments, the application objects may be grouped according to attributes such as, but not limited to, backup options, recovery options, restoring of VMs, monitoring and reporting settings, type of application object, origination of application object, service level objectives, etc. Thus, in some embodiments, application objects with similar backup settings may be grouped together into one dataset. In other embodiments, application objects of the same type may be grouped into datasets. For example, the application objects may comprise a first VM, a second VM, an email application, and a database application. The application objects may be grouped into a dataset based on whether the application objects are virtual based applications or non-virtual based applications. Thus, in some embodiments, a first dataset may comprise the first VM and the second VM while a second dataset may comprise the email application and the database application.

The step 1410 may, in some embodiments, be performed automatically, without human initiation, interaction, or intervention. In other embodiments, the step 1410 may be performed by human interaction, such as operations by an administrator.

Figure 15:
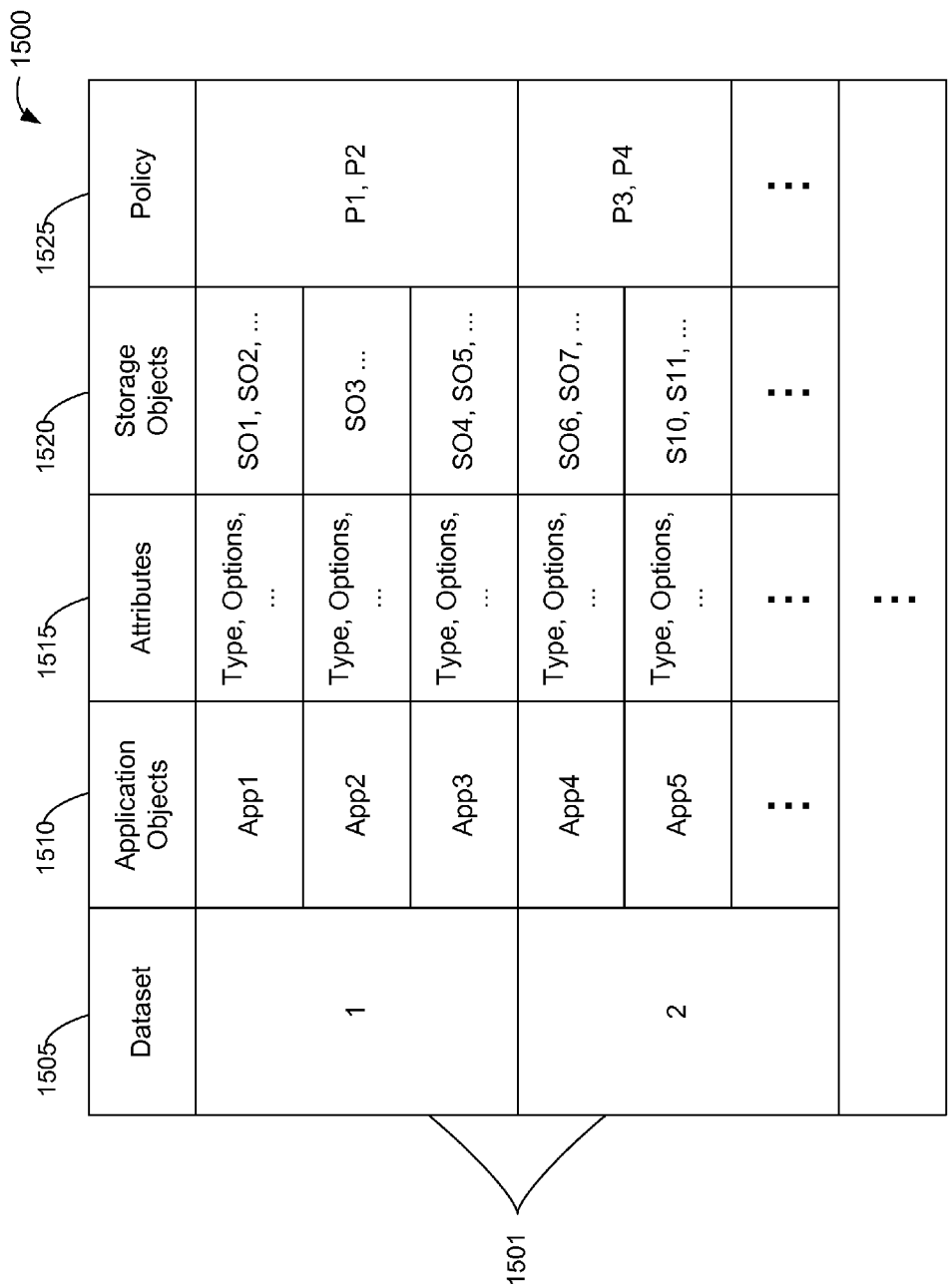
FIG. 15 shows an exemplary application policy management data structure used in some embodiments.

The method 1400 may store (at step 1415) the received data about application objects and storage objects and datasets into an application policy management data structure 1350. In some embodiments, the application policy management data structure 1350 may be located within the management server 1205. FIG. 15 shows an exemplary application policy management data structure 1500 used in some embodiments. In some embodiments, the application policy management data structure 1500 comprises a plurality of dataset entries 1501, each entry 1501 representing a dataset, application object data, and a policy (discussed below). Each entry 1501 may comprise a plurality of data fields for storing data describing the datasets, information about application objects and storage objects, and policies.

In some embodiments, an application policy management data structure entry 1501 representing a dataset may contain data fields for a dataset identifier 1505, application object identifier 1510, application object attributes 1515, storage objects 1520, and policies 1525. The dataset identifier may comprise, for example, information identifying each dataset that has been created by grouping application objects. The application object identifier 1510 may comprise, for example, an entry for each application object of each dataset. The application object attributes 1515 may comprise attributes of each application object of each dataset. For example, the application attributes 1515 may list the type of each application object, the attributes of each application object, backup options of each application object, and/or service level objectives of each application object, etc. The storage objects 1520 may comprise a list of all storage objects of each application object of each dataset. For example, the storage object 1520 may comprise a list of all underlying storage objects of each application object as well as all storage objects that correspond to a virtual storage component. The policy 1520 may comprise information corresponding to at least one policy that will be implemented upon a dataset, such that the policy will be implemented on each application object of the dataset as well as each underlying storage object of each application object, as will be discussed below.

In some embodiments, the application objects field 1510, attributes field 1515, and storage objects field 1520 may be derived from or correspond to the received data about application objects and storage objects, as discussed in step 1405.

In some embodiments, the method 1400 may store data for the dataset field 1505, application objects field 1510, attributes field 1515, and storage objects field 1520 at step 1415. In some embodiments, the data for the policy field 1525 is stored at step 1420 (discussed below). As such, the method 1400 receives information about application objects and storage objects, groups application objects into datasets, and assigns a policy to each dataset, and stores information for each application object of each dataset.

The method 1400 may assign (at step 1420) at least one policy to each dataset. A policy may relate to a storage system characteristic, attribute, or behavior. As such, in some embodiments, the assigning of at least one policy to a dataset comprising application objects and storage objects may relate to how a storage system will interact, manage, or behave with the application objects and each underlying storage object of each of the application objects. In some embodiments, a plurality of policies may be applied to each dataset. In some embodiments, the policy may comprise a backup policy, a protection policy, service level objectives (SLOs), role-based access control (RBAC), recovery policy, monitoring and reporting policy, and any other policy relating to the administration, provisioning, maintenance, and/or management of application objects or storage objects. Thus, for example, a backup policy and a RBAC policy may be assigned to a single dataset. As such, the backup policy and RBAC policy will be applied to each application object of the dataset as well as the underlying storage objects of each application object.

In some embodiments, a backup policy may comprise a backup schedule and schedule backup settings. The backup schedule may, for example, comprise a backup to occur daily at 9 AM. The schedule backup settings may comprise backup settings applicable to the application objects that comprise the dataset. In some embodiments, the backup policy comprises schedule specific backup settings. For example, the backup schedule may comprise a backup occurring at 9 AM and at 9 PM. The schedule backup settings for the 9 AM backup may be different than the settings for the 9 PM settings. Thus, in some embodiments, the backup settings of the backup policy may be schedule specific. Other backup policy settings may comprise, but are not limited to, a backup retention setting specifying the minimum or maximum number of storage backups for application objects of a dataset that may be stored, retention duration, daily retention count, weekly retention count, monthly retention count, a lag warning that indicates whether the storage system should generate a warning event when the newest backup copy is older than a defined threshold, identification for a backup script to be invoked before and after a backup, the time of the day to schedule a backup event, day of the week to schedule a backup event, time of the day to schedule a backup event, and the amount of time between scheduled backup events.

In some embodiments, the backup policy may comprise settings with regard to application objects and their respective time zones. For example, if a first application object is a virtual machine created in California (Pacific Standard Time) and a second application object is a virtual machine created in New York (Eastern Standard Time), the backup policy may comprise different settings for each of the virtual machines in the Pacific Standard Time zone and the Eastern Standard Time zone. For example, the backup policy may comprise a setting to create a backup of application objects in a dataset in the Pacific Standard Time zone at 6 AM local time and another setting to create a backup of application objects in a dataset in the Eastern Standard Time zone at 10 AM local time. Thus, there is a separate backup of each of the application objects from the two different time zones in a dataset.

In some embodiments, a policy may comprise information related to a service level objective (SLO). In some embodiments, each workload has at least one service level objective (SLO) specified for the workload, and a workload comprises an application object requesting storage services of the storage system or a storage object stored on the storage system. As such, an SLO policy may, in some embodiments, determine storage system characteristics for an application object requesting storage services of the storage system.

Each workload may have zero or more specified service-level objectives (SLOs). Each SLO of a workload comprises a minimum or maximum target value/threshold of a SLO metric, the minimum or maximum target value to be achieved by the cluster when servicing the workload. A SLO metric may relate to a storage system characteristic or attribute. In some embodiments, a SLO metric comprises a performance or protection metric. A non-exhaustive list of examples of performance SLO metrics include data throughput, data latency, processor utilization, storage device utilization, input/output operations per second (IOPS) for storage devices, etc. A non-exhaustive list of examples of protection SLO metrics include recovery point objective (allowed time to restore data after data loss disaster situation and generally defines "acceptable loss" in a disaster situation), recovery time objective (allowed time to restore a business process after disruption or data loss disaster situation), recovery consistency objective (data consistency objectives defining a measurement for the consistency of distributed business data within interlinked systems after a disaster incident), etc. As such, in some embodiments, a policy may be comprised of at least one SLO metric.

In some embodiments, a policy may comprise role-based access control (RBAC) information. RBAC is an approach to restricting access to authorized users. As such, the RBAC policy information may specify user authorization for the application objects and the underlying storage objects. The RBAC information may comprise user authorization for managing and administering application objects and storage objects. For example, the RBAC information may comprise user authorization for creating or deleting application objects, managing application objects or storage objects, specify authorized users who can create backups of application objects and storage objects, specify authorized users for restoring application objects and storage objects, and any other action which may require user authorization.

In some embodiments, a policy may comprise recovery information. For example, the policy may comprise information on when to recover an application object such as a virtual machine and the application object's underlying storage objects. In some embodiments, the policy may comprise monitoring and reporting information. For example, the policy may comprise information on how to monitor an application object and when and in particular circumstances to issue a report on an application object. In some embodiments, the policy may contain information for a type of report to be created. For example, if an application object comprises a virtual object, then the policy may contain information for creating a report appropriate for virtual objects.

In some embodiments, the policy may comprise information specific to virtual based application objects. For example, a policy may comprise settings or attributes that are only applicable to a virtual based object such as a virtual machine or a datastore. In some embodiments, the policy may comprise information specific to non-virtual based application objects, such as an email application or a database application.

Storage administrators may be wary of giving control of the backups to an administrator of an application because of the consumption of too many storage resources. In some embodiments, an application policy may address concerns of the storage administrator. For example, in some embodiments, a storage administrator may specify the limits of what is allowed in the storage service and allow an administrator of an application configure an application policy within those limits. In some embodiments, the limits could be expressed in terms of number of snapshots, frequency of backup, schedule, etc.

In some embodiments, the application policy may be used in conjunction with the storage service. For example, the storage service may specify limits and settings for a remote backup while the application policy may have settings for a local backup. This duality between remote backups and local backups may also help avoid proliferation of a storage service. As such, in some embodiments, multiple application administrators may share the same storage service and create different application policies to use different local backup settings.

In some embodiments, a group based mechanism may be used for delegation. For example, a storage service administration may create an empty group for an application administrator and pre-assign delegated privileges on the group. In some embodiments, the application administrator may then create datasets and application policies within the group. These datasets and policies may not be visible to the other application administrators who do not have any privileges on the application objects. In this manner, each application administrator is segregated and can control their own datasets and application policies while sharing the storage service.

The method 1400 may then implement (at step 1425) the policy on each application object of each dataset and each underlying storage object of each application object. As discussed above in section III, the implementation of a policy on an application object may further implement the policy on each underlying storage object of an application object.

Figure 16:
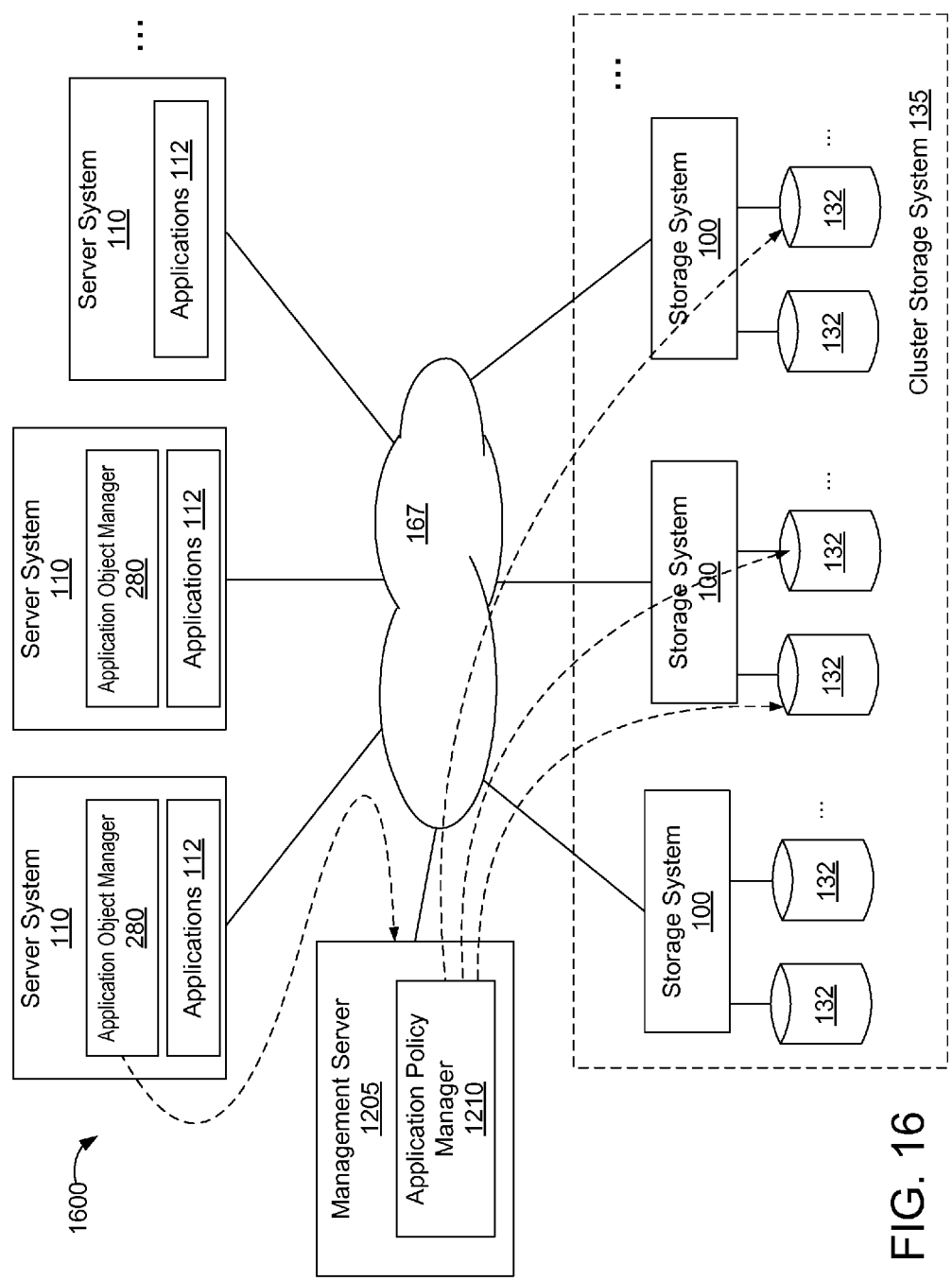
FIG. 16 illustrates a diagram of the operation of an example method of application policy management for an exemplary cluster storage system environment.

FIG. 16 is a schematic diagram of the operation of an example method of application policy management for an exemplary cluster storage system environment 1600. The environment 1600 comprises a set of one or more server systems 110, a cluster 135 comprising a set of one or more storage systems 100, and a management server 1205 that are connected via a connection system 167. In other embodiments, the cluster 135 comprises a plurality of storage systems 100. Each storage system 100 comprises a set of one or more storage objects 132. The connection system 167 may comprise a network, such as a Local Area Network (LAN), Wide Area Network (WAN), metropolitan area network (MAN), the Internet, or any other type of network or communication system between computer systems.

As discussed above, a server system 110 may comprise a computer system that utilizes services of the cluster storage system 135 to store and manage storage objects 132 of the storage systems 100. The interaction between a server system 110 and a storage system 100 can enable the provision of storage services or storage objects. That is, server system 110 may request the services of the storage system 100, and the storage system 100 may return the results of the services requested by the server system 110, by exchanging packets over the connection system 167.

Each server system 110 may comprise an application object manager 280. As discussed above in section III, each application object manager 280 may determine graph metadata and graph data for an application object.

The graph metadata and graph data gathered by an application object manager 280 within a server system 110 may be sent via the connection system 167 to the application policy manager module 1210 located in management server 1205. As such, the application policy manager module 1210 may receive graph metadata and graph data from a plurality of application object managers 280 located within a plurality of server systems 110. Path 1605 illustrates an example of the graph metadata and graph data from an application object manager 280 transmitted through a connection system 167, and being received by an application policy manager module 1210 within the management server 1205. A similar path 1605 may be present for each application object manager 280 within each server system 110. Thus, the application policy manager module 1210 within the management server 1205 may receive graph metadata and graph data from a plurality of application object managers 280.

As discussed above, the application policy manager module 1210 may receive graph metadata and graph data for an application object from an application object manager 280. The application policy manager module 1210 may group application objects into datasets based on the received graph metadata and/or graph data and may assign at least one policy to each dataset comprising application objects. In some embodiments, the application policy manager module 1210 may store the received graph metadata and graph data and dataset information into an application policy data structure 1800.

Information from the application policy management data structure 1800 may be transmitted over the connection network 167 to each storage system 100. The information may be transmitted by the application policy manager module 1210 within the management server 1205. In some embodiments, the information transmitted may comprise any or all of the information from the application policy management data structure 1800. For example, the information transmitted by the application policy manager module 1210 to a storage system 100 may comprise graph metadata, graph data, and/or policy information. In some embodiments, the application policy manager module 1210 may transmit the information to each storage system 100 within the cluster storage system 135. In some embodiments, the application policy manager module 1210 may transmit certain information from at least one entry 1801 to a storage system 100 while transmitting information from another entry 1801 to a second storage system 100.

Path 1610 illustrates an example of the information from the application policy manager module 1210 transmitting through a connection system 167 and being received by a storage system 100 within the cluster storage system 135. As such, the information transmitted from the application policy manager module 1210 to at least one storage system 100 may relate to a storage system characteristic, attribute, or behavior for an application object.

Figure 17:
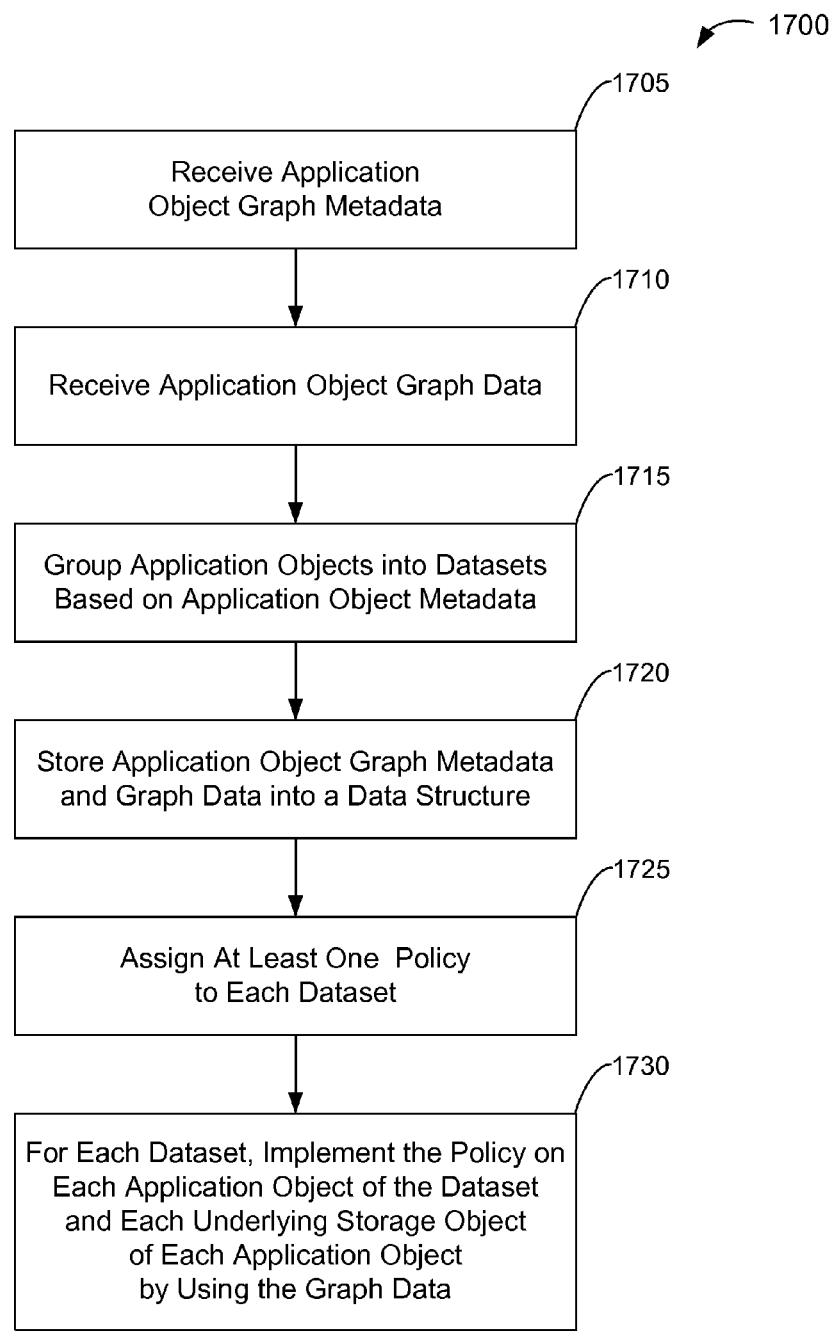
FIG. 17 is a flowchart of a method for receiving graph metadata and graph data and implementing a policy by using the graph data.

FIG. 17 is a flowchart of a method for receiving graph metadata and graph data and implementing a policy by using the graph data. The method 1700 of FIG. 17 is described in relation to FIGS. 16 and 18 which conceptually illustrate the steps of the method 1700. In some embodiments, the method 1700 may receive application object graph metadata and application object graph data, group application objects into datasets based on the application object graph metadata and/or application object graph data, store the application object graph metadata and application object graph data and datasets into a data structure, assign a policy to each dataset, and/or implement the policy on each application object of a dataset and each underlying storage object of each application by using application object graph data automatically, without human initiation, interaction, or intervention. In some embodiments, particular steps of the method 1700 may be performed automatically, without human initiation, interaction, or invention, while other steps of the method 1700 may be performed with human interaction. For example, in some embodiments, steps 1705, 1710, 1720, and 1730 may be performed automatically, without human initiation, interaction, or intervention, while steps 1715 and 1725 may be performed by human interaction, such as commands from an administrator.

In some embodiments, some of the steps of method 1700 are performed or caused to be performed by an application policy manager module 1210 executing on a management server 1205. The application policy manager module 1210 may be configured to operate in conjunction with other software modules of the management server 12005, server system 110, and software modules of the storage system 100 to collectively perform the embodiments described herein.

The method 1700 begins by receiving (at step 1705) graph metadata of an application object. As discussed above in section III, graph metadata may comprise information for understanding and properly processing the information contained in the graph data. For example, the application object graph metadata may comprise one or more types of application objects included in a mapping graph, policies that are permitted to be implemented on each type of application object, and/or features of each type of application object included in a mapping graph. In some embodiments, the graph metadata may be received by the application policy manager 1205 from an application object manager 280.

The method 1700 may receive (at step 1710) graph data of an application object. As discussed above in section III, graph data may describe a mapping graph. In some embodiments, the graph data may describe the various components of the mapping graph including descriptions of the nodes, connectors, and hierarchical relationships between the nodes. For example, graph data may comprise a node type, node identifier, and node name for each node as well as a plurality of node pairs in parent/child relationships showing hierarchical relationships between the nodes.

The method 1700 may group (at step 1715) application objects into datasets based on the graph metadata and/or the graph data. As discussed above, a dataset comprises at least two application objects and may comprise any combination of virtual based applications, non-virtual based applications, and virtual storage components. In some embodiments, the application objects may be grouped into datasets based on the graph metadata. For example, the application objects may be grouped into datasets based on the type of application objects included in a mapping graph. In some embodiments, the application objects may be grouped into datasets based on policies permitted to be implemented on each type of application object and/or features of each type of application object in a mapping graph.

Figure 18:
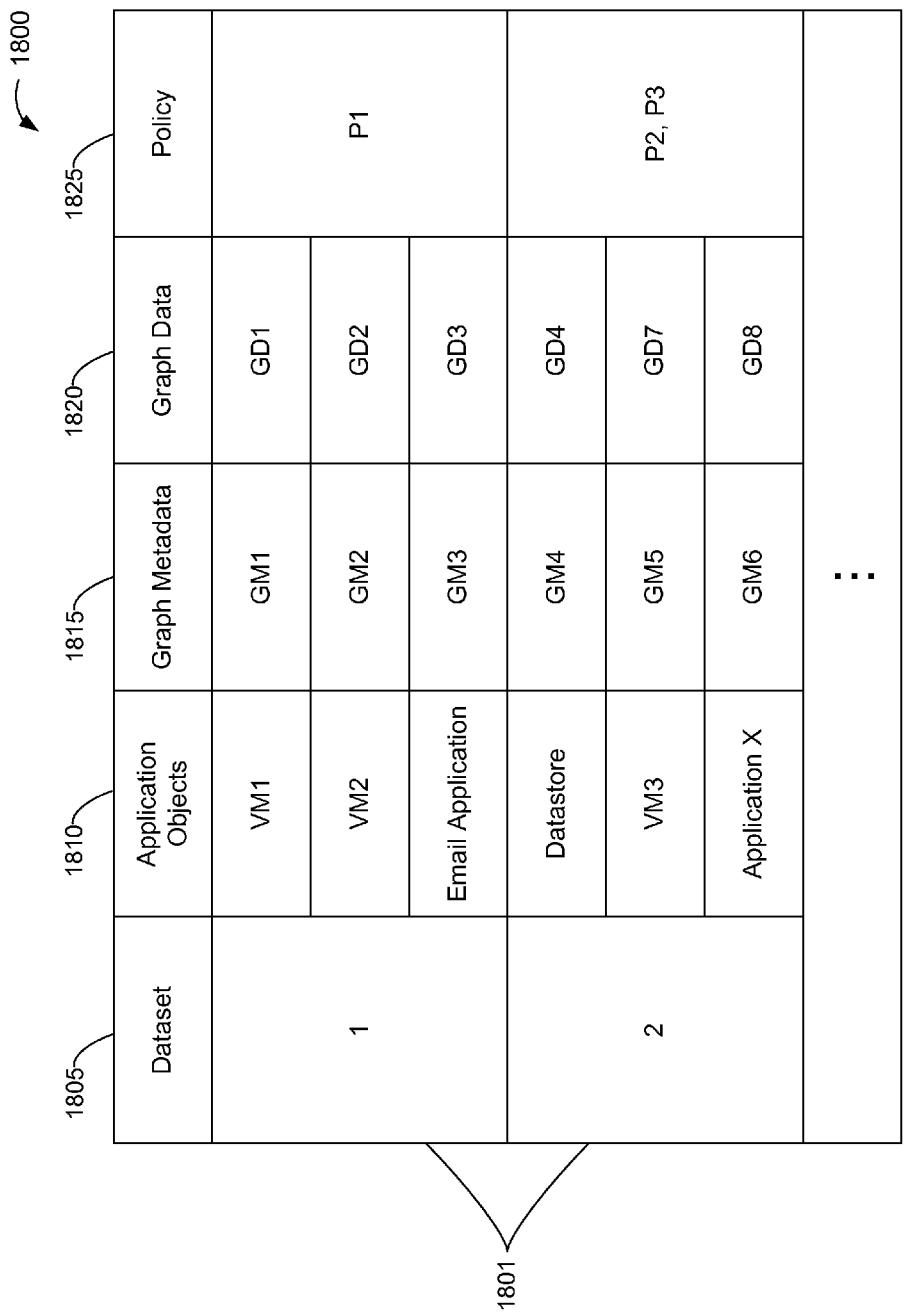
FIG. 18 shows an exemplary application policy management data structured used in some embodiments.

The method 1700 may store (at step 1415) the received graph metadata and graph data into an application policy management data structure 1350. In some embodiments, the application policy management data structure 1350 may be located within the management server 1205. FIG. 18 shows an exemplary application policy management data structure 1500 used in some embodiments. In some embodiments, the application policy management data structure 1800 comprises a plurality of dataset entries 1801, each entry 1801 representing a dataset. Each entry 1801 may comprise a plurality of data fields for storing data describing the datasets, application objects, graph metadata, graph data, and a policy.

In some embodiments, an application policy management data structure entry 1801 representing a dataset may contain data fields for a dataset identifier 1805, application object identifier 1810, graph metadata 1815, graph data 1820, and policy 1825. The dataset identifier may comprise, for example, information identifying each dataset that has been created by grouping application objects. The application identifier 1810 may comprise, for example, an entry for each application of each dataset. For example, the application identifier 1810 may comprise information to identify a virtual machine, an email application, or a datastore as an application object. The graph metadata 1815 may comprise graph metadata for an application object. For example, the graph metadata may comprise the type of application objects included in a mapping graph, policies that are permitted to be implemented on application objects of the mapping graph, and/or features of each type of application object in the mapping graph. The graph data 1820 may describe a mapping graph by including descriptions of each node (type, identifier, name), connectors between nodes, and/or the hierarchical relationships between nodes. The policy 1820 may comprise information corresponding to at least one policy that will be implemented upon a dataset, such that the policy will be implemented on each application object of the dataset and each underlying storage object of each application object through the use of the graph data.

In some embodiments, the method 1700 may store data for the dataset 1805, application objects 1810, graph metadata 1815, and graph data 1820 at step 1720. In some embodiments, the policy 1825 is stored at step 1725 (discussed below). As such, the method 1700 receives graph metadata and graph data, groups application objects into datasets, and assigns a policy to each dataset, and stores information for each application object of each dataset.

The method 1700 may assign (at step 1725) at least one policy to each dataset. As discussed above, a policy may relate to a storage system characteristic, attribute, or behavior. As such, in some embodiments, the assigning of at least one policy to a dataset comprising application objects may relate to how a storage system will interact, manage, or behave with the application objects and each underlying storage object of each of the application objects. In some embodiments, a plurality of policies may be applied to each dataset. In some embodiments, the policy may comprise a backup policy, a protection policy, service level objectives (SLOs), or a role-based access control (RBAC) policy.

The method 1700 may then implement (at step 1730) the policy on each application object of each dataset and each underlying storage object of each application object by using the graph data. As discussed above in section III, the implementation of a policy on an application object may further implement the policy on each underlying storage object of an application object through the use of the graph data.

As such, in some embodiments, the method 1700 may implement a policy on a dataset containing an application object such as a virtual storage component. As discussed above in section III, a virtual storage component may comprise, for example, a datastore or a virtual machine disk (VMDK). The method 1700 may receive graph metadata for an application object such as a datastore. In some embodiments, the graph metadata for a datastore may comprise data identifying that the application object type comprises a datastore, policies that are permitted to be implemented on a datastore, and features of the datastore. For example, the graph metadata for the datastore may indicate that the application object type is a datastore, indicate that the permitted policies for a datastore are RBAC and backup, and describe various features of the datastore.

Next, the method 1700 may receive graph data for the datastore. The graph data may describe a mapping graph. In some embodiments, the mapping graph for a datastore may describe a node type, node identifier, and node name for each node in the mapping graph and a plurality of node pairs in parent/child relationships showing the hierarchical relationship between the nodes. The method 1700 may assign a policy to the dataset comprising the datastore as an application object. For example, the method 1700 may assign a policy to the dataset from the permitted policies in the graph metadata. Next, the method 1700 may implement the policy on the dataset. The method 1700 may implement the policy on the datastore and the policy is implemented to the collection of storage objects/resources that comprise (map to and underlies) the datastore. In some embodiments, the method 1700 may implement the policy to a datastore's underlying storage objects/resources through the use of the graph data.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A system for managing data policies on a virtual machine hosted on a server, the virtual machine being allocated at least one virtual storage component, each virtual storage component having a corresponding storage object hosted on a storage system for storing data of the virtual machine, the system comprising:
    a manager engine configured for:
        determining a mapping between the virtual machine hosted on the server and each storage object on the storage system that the virtual machine uses for data storage by:
            for each storage object, determining high-level storage object information used by the virtual machine to access a virtual storage component corresponding to the storage object, the high-level storage object information mapping the virtual machine to the virtual storage component;
            for each storage object, determining low-level storage object information used by a storage system to access the storage object which corresponds to the virtual storage component, the low-level storage object information mapping the virtual storage component to the storage object; and
            for each storage object, combining the high-level and low-level storage object information to determine a mapping relationship between the virtual machine hosted on the server and the storage object on the storage system;
        producing a mapping graph representing mappings between the virtual machine and each of its storage objects, the mapping graph comprising:
            a virtual machine node representing the virtual machine;
            at least one virtual storage node, each virtual storage node representing a virtual storage component and comprising a child node of the virtual machine node; and
            at least one storage object node, each storage object node representing a storage object and comprising a child node of a virtual storage node;
        producing graph data describing the mapping graph for the virtual machine; and
        performing data policy management on the virtual machine by using the graph data to perform at least one data policy on each storage object of the virtual machine.

2. The system of claim 1, wherein the mapping graph for the virtual machine comprises:

43 a plurality of nodes interconnected by a plurality of connectors, the plurality of nodes arranged in a plurality of hierarchical levels and parent/child relationships.

3. The system of claim 1, wherein the mapping graph for the virtual machine further comprises:
   a server node representing the server hosting the virtual machine, the server node comprising a parent node of the virtual machine node; and
   a storage system node representing the storage system, the storage system node comprising a child node of a storage object node.

4. The system of claim 1, wherein:
   the graph metadata specifies a type of virtual machine and data policies permitted for the type of virtual machine; and
   a first set of one or more data policies is permitted for a first type of virtual machine and a second set of one or more data policies is permitted for a second type of virtual machine, the first and second sets comprising different sets of data policies.

5. The system of claim 1, wherein:
   the graph data specifies parent/child relationships between the nodes in the mapping graph and a type of node for each node; and
   the type of node may specify a virtual machine node representing a virtual machine, a virtual storage node representing a virtual storage component, or a storage object node representing a storage object.

6. The system of claim 1, wherein:
   the server executes a server operating system; and
   the virtual machine comprises a separate instance of an operating system.

7. A non-transitory computer readable medium having instructions stored thereon when executed by a processor, manage data policies on a virtual machine hosted on a server, the virtual machine being allocated at least one virtual storage component, each virtual storage component having a corresponding storage object hosted on a storage system for storing data of the virtual machine, the computer readable medium comprising instructions for:
   determining a mapping between the virtual machine hosted on the server and each storage object on the storage system that the virtual machine uses for data storage by:
      for each storage object, determining high-level storage object information used by the virtual machine to access a virtual storage component corresponding to the storage object, the high-level storage object information mapping the virtual machine to the virtual storage component;
      for each storage object, determining low-level storage object information used by a storage system to access the storage object which corresponds to the virtual storage component, the low-level storage object information mapping the virtual storage component to the storage object; and
      for each storage object, combining the high-level and low-level storage object information to determine a mapping relationship between the virtual machine hosted on the server and the storage object on the storage system;
   producing a mapping graph representing mappings between the virtual machine and each of its storage objects, the mapping graph comprising:
      a virtual machine node representing the virtual machine;

44 at least one virtual storage node, each virtual storage node representing a virtual storage component and comprising a child node of the virtual machine node; and
      at least one storage object node, each storage object node representing a storage object and comprising a child node of a virtual storage node;
   producing graph data describing the mapping graph for the virtual machine; and
   performing data policy management on the virtual machine by using the graph data to perform at least one data policy on each storage object of the virtual machine.

8. The computer readable medium of claim 7, wherein the mapping graph for the virtual machine comprises:
   a plurality of nodes interconnected by a plurality of connectors, the plurality of nodes arranged in a plurality of hierarchical levels and parent/child relationships.

9. The computer readable medium of claim 7, wherein the mapping graph for the virtual machine further comprises:
   a server node representing the server hosting the virtual machine, the server node comprising a parent node of the virtual machine node; and
   a storage system node representing the storage system, the storage system node comprising a child node of a storage object node.

10. The computer readable medium of claim 7, wherein
    the graph metadata specifies a type of virtual machine and data policies permitted for the type of virtual machine; and
    a first set of one or more data policies is permitted for a first type of virtual machine and a second set of one or more data policies is permitted for a second type of virtual machine, the first and second sets comprising different sets of data policies.

11. The computer readable medium of claim 7, wherein:
    the graph data specifies parent/child relationships between the nodes in the mapping graph and a type of node for each node; and
    the type of node may specify a virtual machine node representing a virtual machine, a virtual storage node representing a virtual storage component, or a storage object node representing a storage object.

12. The computer readable medium of claim 7, wherein:
    the server executes a server operating system; and
    the virtual machine comprises a separate instance of an operating system.

13. A method for managing data policies
    on a virtual machine hosted on a server, the virtual machine being allocated at least one virtual storage component, each virtual storage component having a corresponding storage object hosted on a storage system for storing data of the virtual machine, the method comprising:
    using computer hardware for performing:
       determining a mapping between the virtual machine hosted on the server and each storage object on the storage system that the virtual machine uses for data storage by:
          for each storage object, determining high-level storage object information used by the virtual machine to access a virtual storage component corresponding to the storage object, the high-level storage object information mapping the virtual machine to the virtual storage component;
          for each storage object, determining low-level storage object information used by a storage system to access the storage object which corresponds to the virtual storage component, the low-level storage object information mapping the virtual storage component to the storage object; and for each storage object, combining the high-level and low-level storage object information to determine a mapping relationship between the virtual machine hosted on the server and the storage object on the storage system;

producing a mapping graph representing mappings between the virtual machine and each of its storage objects, the mapping graph comprising:

a virtual machine node representing the virtual machine;

at least one virtual storage node, each virtual storage node representing a virtual storage component and comprising a child node of the virtual machine node; and at least one storage object node, each storage object node representing a storage object and comprising a child node of a virtual storage node;

producing graph data describing the mapping graph for the virtual machine; and performing data policy management on the virtual machine by using the graph data to perform at least one data policy on each storage object of the virtual machine.

14. The method of claim 13, wherein:

the server executes a server operating system; and the virtual machine comprises a separate instance of an operating system.

* * * * *